(12) United States Patent
Lim et al.

(10) Patent No.: US 11,973,944 B2
(45) Date of Patent: Apr. 30, 2024

(54) IMAGE ENCODING/DECODING METHOD AND DEVICE, AND RECORDING MEDIUM IN WHICH BITSTREAM IS STORED FOR BLOCK DIVISION AT PICTURE BOUNDARY

(71) Applicant: Electronics and Telecommunications Research Institute, Daejeon (KR)

(72) Inventors: Sung Chang Lim, Daejeon (KR); Jung Won Kang, Daejeon (KR); Jin Ho Lee, Daejeon (KR); Ha Hyun Lee, Seoul (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 587 days.

(21) Appl. No.: 17/256,157

(22) PCT Filed: Jun. 27, 2019

(86) PCT No.: PCT/KR2019/007832
§ 371 (c)(1),
(2) Date: Dec. 24, 2020

(87) PCT Pub. No.: WO2020/004987
PCT Pub. Date: Jan. 2, 2020

(65) Prior Publication Data
US 2021/0274175 A1 Sep. 2, 2021

(30) Foreign Application Priority Data
Jun. 27, 2018 (KR) .................. 10-2018-0074318

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/176* (2014.11); *H04N 19/96* (2014.11)

(58) Field of Classification Search
None
See application file for complete search history.

(56) References Cited

U.S. PATENT DOCUMENTS

2018/0103268 A1 4/2018 Huang et al.
2019/0075328 A1* 3/2019 Huang ................. H04N 19/119
(Continued)

FOREIGN PATENT DOCUMENTS

CN 108141604 A 6/2018
KR 100772576 B1 11/2007
(Continued)

OTHER PUBLICATIONS

Hsiang et al., "CE1.2.0.10: CU partitioning along picture boundaries", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0224-v1.*

*Primary Examiner* — Edemio Navas, Jr.
(74) *Attorney, Agent, or Firm* — BROADVIEW IP LAW, PC

(57) ABSTRACT

In this specification, a image decoding method is disclosed. The image decoding method of the present invention comprises, decoding block partition information of a current block included in a current picture, determining a partitioning scheme for the current block according to the block partition information and partitioning the current block using the partitioning scheme determined, wherein the partitioning scheme is determined according to whether the current block includes a boundary of the current picture.

6 Claims, 16 Drawing Sheets

(51) Int. Cl.
    *H04N 19/176*    (2014.01)
    *H04N 19/96*     (2014.01)

(56)         References Cited

U.S. PATENT DOCUMENTS

2020/0014928 A1*  1/2020  Hsiang ................. H04N 19/157
2020/0077094 A1*  3/2020  Poirier ................ H04N 19/167
2020/0236359 A1*  7/2020  Gao ....................... H04N 19/46
2021/0084298 A1*  3/2021  Gao ................... H04N 19/1883
2021/0136422 A1*  5/2021  Huang .................... H04N 5/765

FOREIGN PATENT DOCUMENTS

KR      1020170128389  A    11/2017
KR      1020180031615  A     3/2018
KR      1020180033030  A     4/2018
KR      1020180041576  A     4/2018
WO            0186962  A1   11/2001
WO         2016148438  A2    9/2016

* cited by examiner

IMAGE ENCODING/DECODING METHOD AND DEVICE, AND RECORDING MEDIUM IN WHICH BITSTREAM IS STORED FOR BLOCK DIVISION AT PICTURE BOUNDARY

TECHNICAL FIELD

The present invention relates to an image encoding/decoding method and apparatus and a recording medium in which a bitstream is stored. More particularly, the present invention relates to a block structure-based image encoding/decoding method and apparatus and a recording medium in which a bitstream is stored.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency, etc. Image data may be effectively compressed by using such image compression technology, and may be transmitted or stored.

In the conventional video encoding/decoding, since only the quad-tree block structure is used, there is a problem in that there is limitation in improving coding efficiency.

DISCLOSURE

Technical Problem

An objective of the present invention is to provide an image encoding/decoding method and apparatus capable of improving compression efficiency, and a recording medium in which a bitstream generated by the method or apparatus is stored.

Another objective of the present invention is to provide an image encoding/decoding method and apparatus capable of improving compression efficiency by using block shapes having various aspect ratios (i.e., horizontal to vertical ratios), and a recording medium in which a bitstream generated by the method or apparatus is stored.

A further object of the present invention is to provide an image encoding/decoding method and apparatus capable of improving compression efficiency by determining whether to use a neighboring block as a reference block of a current block depending on coding parameters of the current block and the coding parameters of the neighboring block, and a recording medium in which a bitstream generated by the method or apparatus is stored.

Technical Solution

According to the present invention, image decoding method comprise decoding block partition information of a current block included in a current picture, determining a partitioning scheme for the current block according to the block partition information and partitioning the current block using the partitioning scheme determined, wherein the partitioning scheme is determined according to whether the current block includes a boundary of the current picture.

In the image decoding method, wherein the partitioning scheme is any one scheme selected from among quad tree partitioning, horizontal binary tree partitioning, vertical binary tree partitioning, horizontal ternary tree partitioning, and vertical ternary tree partitioning.

In the image decoding method, wherein when the current block includes a right boundary of the current picture, the partitioning scheme is determined to be the vertical binary tree partitioning.

In the image decoding method, wherein when a height of the current block exceeds a size of a maximum transform block within the current block, the partitioning scheme is determined to be any one partitioning scheme except for the vertical binary tree partitioning.

In the image decoding method, wherein the size of the maximum transform block is a predefined value.

In the image decoding method, wherein when the current block includes a lower boundary of the current picture, the partitioning scheme is determined to be the horizontal binary tree partitioning.

In the image decoding method, wherein when a width of the current block exceeds a size of a maximum transform block within the current picture, the partitioning scheme is determined to be any one partitioning scheme other than the horizontal binary tree partitioning.

In the image decoding method, wherein the size of the maximum transform block is a preset value.

In the image decoding method, wherein when the current block includes at least a right boundary or an upper boundary of the current picture, the partitioning scheme is determined to be any one scheme other than the ternary tree partitioning.

In the image decoding method, wherein when the current block includes a right boundary and a lower boundary of the current picture, the partitioning scheme is determined to be the quad tree partitioning.

According to the present invention, image encoding method comprise determining a partitioning scheme of a current block included in a current picture, partitioning the current block using a partitioning scheme that is determined and encoding block partition information of the current block, wherein the partitioning scheme is determined according to whether the current block includes a boundary of the current picture.

In the image encoding method, wherein the partitioning scheme is any one scheme selected from among quad tree partitioning, horizontal binary tree partitioning, vertical binary tree partitioning, horizontal ternary tree partitioning, and vertical ternary tree partitioning.

In the image encoding method, wherein when the current block includes a right boundary of the current picture, the partitioning scheme is determined to be the vertical binary tree partitioning.

In the image encoding method, wherein when a height of the current block exceeds a size of a maximum transform block within the current picture, the partitioning scheme is determined to be any one scheme other than the vertical binary tree partitioning.

In the image encoding method, wherein the size of the maximum transform block is a predefined value.

In the image encoding method, wherein when the current block includes a lower boundary of the current picture, the partitioning scheme is determined to be the horizontal binary tree partitioning.

In the image encoding method, wherein when a width of the current block exceeds a size of a maximum transform block within the current picture, the partitioning scheme is determined to be any one scheme other than the horizontal binary tree partitioning.

In the image encoding method, wherein the size of the maximum transform block is a preset value.

In the image encoding method, wherein when the current block includes at least either a right boundary or an upper boundary of the current picture, the partitioning scheme is determined to be any one scheme other than the ternary tree partitioning.

In the image encoding method, wherein when the current block includes a right boundary and a lower boundary of the current picture, the partitioning scheme is determined to be the quad tree partitioning.

According to the present invention, a computer-readable recording medium in which a bitstream that is received by an image decoding apparatus to reconstruct a current block is stored, wherein the bitstream contains block partition information of the current block, the block partition information is used to determine a partitioning scheme of the current block, a partitioning scheme that is determined to be the partitioning scheme of the current block is used to partition the current block, and the partitioning scheme is determined according to whether the current block includes a boundary of the current picture.

Advantageous Effects

According to the present invention, it is possible to provide an image encoding/decoding method and apparatus capable of improving compression efficiency and to provide a recording medium in which a bitstream generated by the method or apparatus is stored.

In addition, according to the present invention, it is possible to provide an image encoding/decoding method and apparatus capable of improving compression efficiency by using block shapes having various aspect ratios and a recording medium in which a bitsteam generated by the method or apparatus is stored.

In addition, according to the present invention, it is possible to provide an image encoding/decoding method and apparatus capable of improving compression efficiency by determining whether to use a neighboring block as a reference block of a current block depending on the coding parameters of the current block and the coding parameters of the neighboring block and to provide a recording medium in which a bitstream generated by the method or apparatus is stored.

DESCRIPTION OF DRAWINGS

FIGS. 11 and 12 are diagrams illustrating a method of inserting a neighboring block adjacent to a current block into to a candidate list depending on the length of the border between the current block and the neighboring block, according to one embodiment of the present invention;

FIGS. 13 and 14 are diagrams illustrating a method of inserting a neighboring block adjacent to a current block into a candidate list depending on the size of the neighboring block, according to one embodiment of the present invention;

FIGS. 15 and 16 are diagrams illustrating a method of inserting a neighboring block adjacent to a current block into a candidate list depending on the depth of the neighboring block, according to one embodiment of the present invention;

FIGS. 17 and 18 are diagrams illustrating a method of inserting a neighboring block adjacent to a current block into a candidate list depending on the partition tree type of the neighboring block, according to an embodiment of the present invention;

FIGS. 19 and 20 are diagrams illustrating a method of inserting a neighboring block adjacent to a current block into a candidate list depending on the block form of the neighboring block, according to one embodiment of the present invention;

BEST MODE

Figure 1:
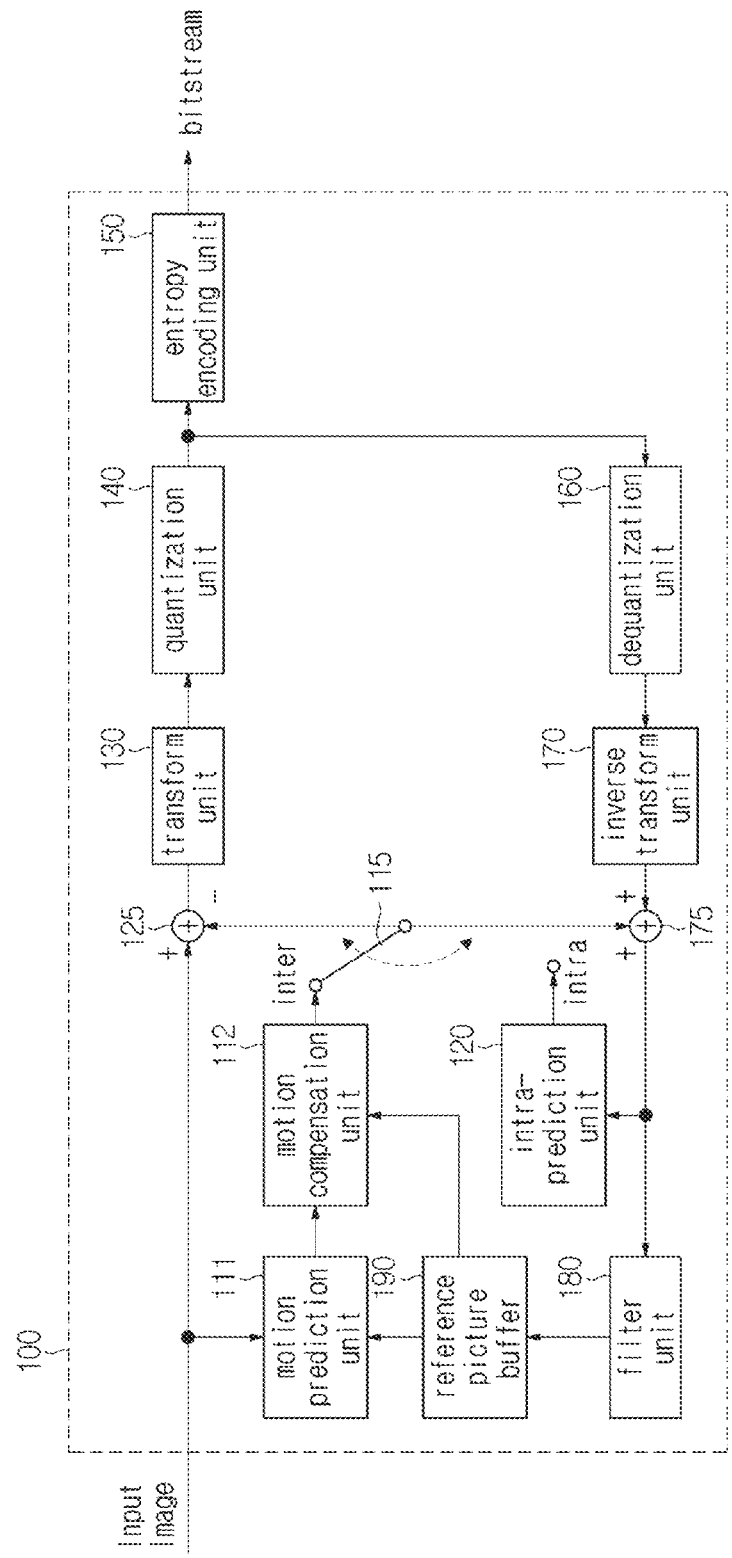
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

The adaptation parameter set refers to a parameter set that can be shared and referred to by different pictures, sub-pictures, slices, tile groups, tiles, or bricks. In addition, sub-pictures, slices, tile groups, tiles, or bricks in a picture may refer to different adaptation parameter sets to use information in the different adaptation parameter sets.

Regarding the adaptation parameter sets, sub-pictures, slices, tile groups, tiles, or bricks in a picture may refer to different adaptation parameter sets by using identifiers of the respective adaptation parameter sets.

Regarding the adaptation parameter sets, slices, tile groups, tiles, or bricks in a sub-picture may refer to different adaptation parameter sets by using identifiers of the respective adaptation parameter sets.

Regarding the adaptation parameter sets, tiles or bricks in a slice may refer to different adaptation parameter sets by using identifiers of the respective adaptation parameter sets.

Regarding the adaptation parameter sets, bricks in a tile may refer to different adaptation parameter sets by using identifiers of the respective adaptation parameter sets.

The parameter set or header of a sub-picture may include information on an adaptation parameter set identifier. Thus, an adaptation parameter set corresponding to the adaptation parameter set identifier may be used in the sub-picture.

The parameter set or header of a tile may include an adaption parameter set identifier so that an adaption parameter set corresponding to the adaption parameter set identifier may be used in the tile.

The header of a brick may include information on an adaptation parameter set identifier so that an adaptation parameter set corresponding to the adaptation parameter set identifier may be used in the brick.

The picture may be split into one or more tile rows and one or more tile columns.

The sub-picture in a picture may be split into one or more tile rows and one or more tile columns. The sub-picture may be a rectangular or square region in a picture and may include one or more CTUs. The sub-picture may include at least one tile, brick, and/or slice.

The tile may be a rectangular or square region in a picture and may include one or more CTUs. The tile may be split into one or more bricks.

The brick may refer to one or more TU rows in a tile. The tile may be split into one or more bricks, and each brick may have at least one CTU row. A tile that is not split into two or more bricks may also mean a brick.

The slice may include one or more tiles in a picture and may include one or more bricks in a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction.

For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantizer in the dequantization unit 160, or may be inverse-transformed in the inverse-transform unit 170. A dequantizer or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
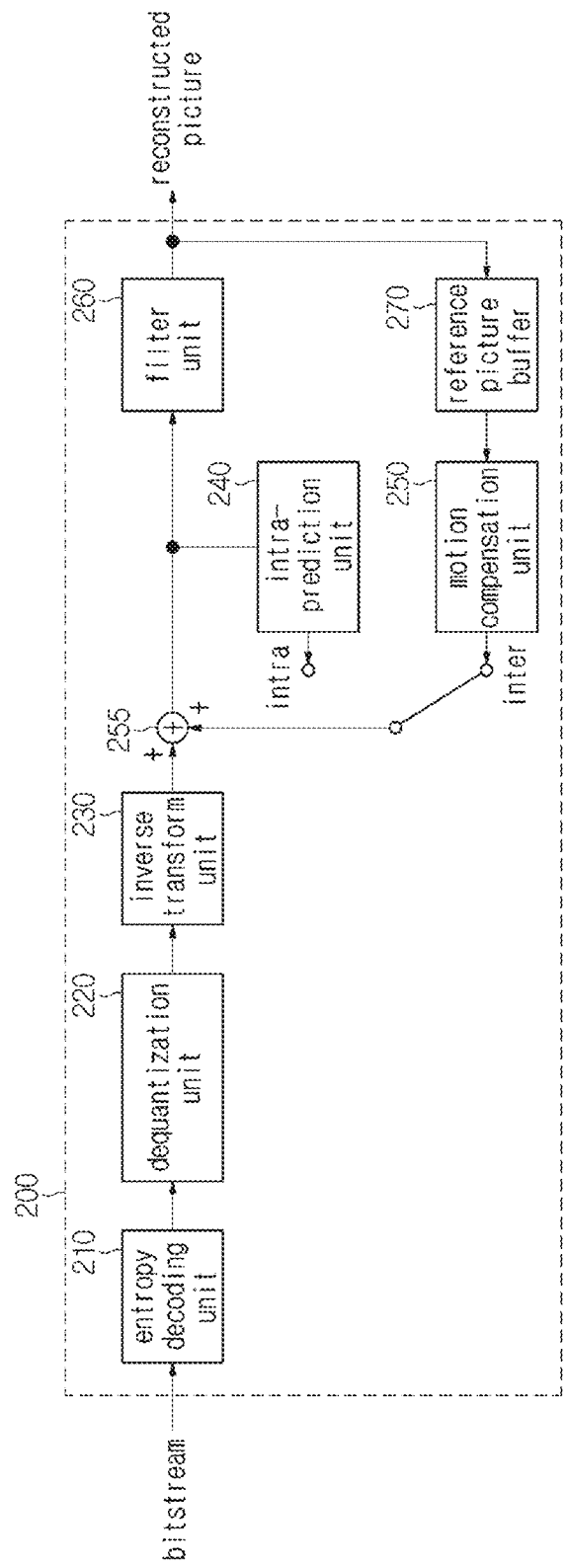
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
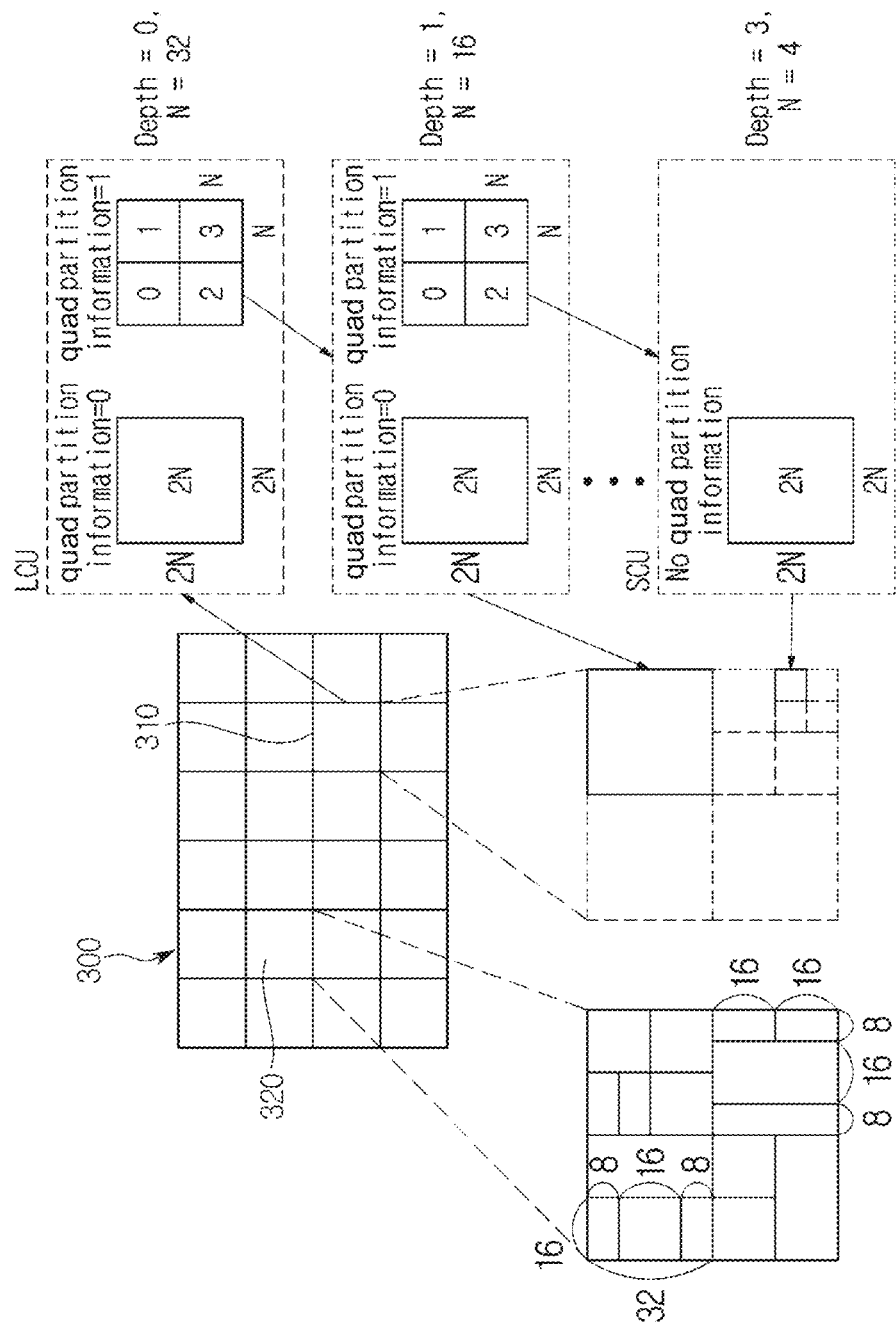
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer including 1, 2, 3, 4, 5, 6, 7, 8, 12, 16, 20 etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a minimum coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

For example, a CTU may have a size of 64×64, 128×128, 256×256, 512×512, and so forth in which the vertical size is equal to the horizontal size. In this case, the vertical or horizontal size of the CTU may be a positive integer which is one of the multiples of 2, 4, and 8, or the n-th power of 2 (=2n). Alternatively, the CTU may have a size of 128×64, 64×128, 256×64, 64×256, 512×64, 64×512, 256×128, 128×256, and so forth in which the vertical size is different from the horizontal size. Similarly, in this case, the vertical or horizontal size of the CTU may be a positive integer that is one of the multiples of 2, 4, and 8, or the n-th power of 2 (=2n).

For example, a CU may have a size of 4×4, 8×8, 16×16, 32×32, 64×64, 128×128, 256×256, 512×512, and so forth in which the vertical size is equal to the horizontal size. In this case, the vertical or horizontal size of the CU may be a positive integer that is one of the multiples of 2, 4, and 8, or the n-th power of 2 (=2n). Alternatively, for example, the CU may have a size of 4×8, 8×4, 4×16, 16×4, 4×32, 32×4, 4×64, 64×4, 8×16, 16×8, 8×32, 32×8, 8×64, 64×8, 16×32, 32×16, 16×64, 64×16, 16×128, 128×16, 32×64, 64×32, 32×128, 128×32, 128×64, 64×128, 256×64, 64×256, 512×64, 64×512, 256×128, 128×256, and the like. Similarly, in this case, the vertical or horizontal size of the CU may be a positive integer that is one of the multiples of 2, 4, and 8, or the n-th power of 2 (=2n)·2$^n$ For example, an SCU may have a size of 2×2, 4×4, 8×8, 16×16, 32×32, 64×64, 64×64, 128×128, 256×256, 512×512, and so forth in which the vertical size is equal to the horizontal size. In this case, the vertical or horizontal size of the CTU may be a positive integer which is one of the multiples of 2, 4, and 8, or the n-th power of 2 (=2n). Also, for example, the CTU may have a size such as 2×4, 4×2, 2×8, 8×2, 2×16, 16×2, 2×32, 32×2, 4×8, 8×4, 4×16, 16×4, 4×32, 32×4, 4×64, 64×4, 8×16, 16×8, 8×32, 32×8, 8×64, 64×8, 16×32, 32×16, 16×64, 64×16, 16×128, 128×16, 32×64, 64×32, 32×128, 128×32, 128×64, 64×128, 256×64, 64×256, 512×64, 64×512, 256×128, 128×256, and so forth in which the vertical size is different from the horizontal size. Similarly, in this case, the vertical or horizontal size of the CTU may be a positive integer that is one of the multiples of 2, 4, and 8, or the n-th power of 2 (=2n).

At least one of the CTU, CU, SCU, and sub-CU may have a size having a vertical to horizontal ratio or a horizontal to vertical ratio such as N:N, 1.5×N:N, 2×N:N, 2.5×N:N, 3×N:N, 3.5×N:N, 4×N:N, 4.5×N:N, 5×N:N, 5.5×N:N, 6×N:N, N:1.5×N, N:2×N, N:2.5×N, N:3×N, N:3.5×N, N:4×N, N:4.5×N, N:5×N, N:5.5×N, N:6×N, and so forth. Here, the N may be a positive integer among 2, 4, 6, 8, 16, and so forth. The sub-CU may refer to a unit or a sub-block that is not generated through partitioning in a block structure but is generated by partitioning a CU at least one time in the process of encoding/decoding the CU.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one parent coding unit is split into two child coding units, the horizontal or vertical size of each of the two child coding units has a ratio of 1/K:(K−1)/K or (K−1)/K:1/K with respect to the horizontal or vertical size of the parent coding unit. Here, the K may be a positive integer of 2, 3, 4, 5, 6, 7, 8, 16, 32, and so forth.

For example, when a 32×32 parent coding unit is vertically split into into a ratio of 1:3, the resulting two child coding units may have sizes of 8×32 and 24×32, respectively.

On the other hand, when an 8×32 parent coding unit is horizontally split into a ratio of 1:3, the resulting two child coding units may have sizes of 8×8 and 8×24, respectively.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

For example, when one parent coding unit is split into three child coding units, the horizontal size or the vertical size of the parent coding unit may be split into a ratio of K:L:M such as 1:2:1, 2:1:1, 1:1:2, 1:4:1, 4:1:1, 1:1:4, 1:3:2, 2:3:1, 1:6:1, 6:1:1, 1:1:6, 1:5:2, and 2:5:1. Here, each of the K, L, M may be a positive integer.

For example, when a 16×32 parent coding unit is horizontally split into a ratio of 1:6:1, the resulting three child coding units may have sizes of 16×4, 16×24, and 16×4, respectively, in this order from the upper side.

Alternatively, for example, when a 32×32 parent coding unit is vertically split into a ratio of 6:1:1, the resulting three child coding units may have sizes of 24×32, 4×32, and 4×32, respectively, in this order from the left side.

Further alternatively, for example, when the size of a coding unit is not a multiple of the sum (K+L+M) of K, L, and M, the coding unit may be split according to a predetermined rule. For example, when the M has the largest value in a ratio of K:L:M, a positive integer n is added to the M such that the size of the coding unit becomes a multiple of the sum (K+L+M+n) of K, L, and M+n. That is, the coding unit may be split into a ratio of K:L:(M+n).

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order.

For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

For example, a binary tree partition may be preferentially applied to a CTU. A coding unit that can no longer be split by a binary tree partition is referred to as a leaf node of a binary tree. A coding unit corresponding to a leaf node of a binary tree may become the root node of a quad tree or a ternary tree. That is, a coding unit corresponding to a leaf node of a binary tree may be split by a quad tree partition or a ternary tree partition or may no longer be split. When a coding unit corresponding to a leaf node of a binary tree is split by a quad tree partition or a ternary tree partition, the resulting child coding units are no longer split by a binary tree partition. Thus, block partitioning and/or signaling of partition information can be efficiently performed.

For example, a ternary tree partition may be preferentially applied to a CTU. A coding unit that can no longer be split by a ternary tree partition may be referred to as a leaf node of a ternary tree. A coding unit corresponding to a leaf node of a ternary tree may become the root node of a quad tree or a binary tree. That is, a coding unit corresponding to a leaf node of a ternary tree may be further split by a quad tree partition or a binary tree partition or may no longer be split. When a coding unit corresponding to a leaf node of a ternary tree is split by a quad tree partition or a binary tree partition, the resulting child coding units may no longer be split by a ternary tree partition. Therefore, the block partitioning and/or the signaling of partition information can be efficiently performed.

For example, a quad tree partition, a ternary tree partition, and a binary tree partition may be sequentially applied to a current CTU. Alternatively, a ternary tree partition, a binary tree partition, and a quad tree partition may be sequentially applied to a current CTU.

For example, among a quad tree partition, a binary tree partition, and a ternary tree partition to be applied to a CTU, a partition of splitting the vertical size or the horizontal size into a symmetric ratio is first applied and a partition of splitting the vertical size or the horizontal size into an asymmetric ratio is then applied.

Alternatively, for example, when a CTU is split by a binary tree partition, the priority of partitioning schemes may vary depending on whether a horizontal size or a vertical size is split into a symmetric ratio or an asymmetric ratio.

Alternatively, for example, when a CTU is split by a ternary tree partition, the priority of partitioning schemes may vary depending on whether a horizontal size or a vertical size is split into a symmetric ratio or an asymmetric ratio or on whether two segments of the three segments of the horizontal size or the vertical size have a symmetric ratio or an asymmetric ratio.

The fact that a coding unit corresponding to a node of a quad tree is partitioned may be signaled using quad tree partition information. The quad tree partition information having a first value (e.g., "I") may indicate that a current coding unit is partitioned by the quad tree partition structure. The quad tree partition information having a second value (e.g., "0") may indicate that a current coding unit is not partitioned by the quad tree partition structure. The quad tree partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

As another example, there may be no priority between a quad tree partition and a ternary tree partition. That is, a coding unit corresponding to a leaf node of a binary tree may be first split by either a quad tree partition or a ternary tree partition. Alternatively, a coding unit resulting from a quad tree partition or a ternary tree partition may be further split by a quad tree partition or a ternary tree partition or may no longer be split.

As a further example, there may be no priority between a quad tree partition and a binary tree partition. That is, a coding unit corresponding to a leaf node of a ternary tree may be further split by a quad tree partition or a binary tree partition. Alternatively, a coding unit resulting from a quad tree partition or a binary tree partition may be further split by a quad tree partition or a binary tree partition or may no longer be split.

For example, there may be no priority between a binary tree partition and a ternary tree partition depending on whether a vertical size or a horizontal size is to be split into a symmetric ratio or an asymmetric ratio.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

In this case, the signaling order may be determined by a value preset in the encoder/decoder, or by a value signaled from the encoder to the decoder.

For example, the multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

To determine whether to split a coding unit corresponding to each node of a multi-type tree, at least one type of information selected from among information indicating whether to apply a multi-type tree partition, partition direction information, partition ratio information, and partition tree information may be signaled. In order to split a coding unit corresponding to each node of a multi-type tree, the information indicating whether to apply a multi-type tree partition, the partition direction information, the partition ratio information, and the partition tree information may be sequentially signaled.

For example, in order to split a coding unit corresponding to each node of a multi-type tree, the information indicating whether to apply a multi-type tree partition, the partition direction information, the partition tree information, and the partition ratio information may be sequentially signaled.

Alternatively, in order to split a coding unit corresponding to each node of a multi-type tree, the information indicating whether to apply a multi-type tree partition, the partition ratio information, the partition direction information, and the partition tree information may be sequentially signaled.

When a coding unit corresponding to each node of a multi-type tree is split by a multi-type tree partition, the coding unit may further contain partition ratio information. The partition ratio information may indicate a ratio used for multi-type tree partitioning.

For example, in the case of a binary tree partition, examples of the partition ratio indicated by the partition ratio information will be described below.

When the partition ratio information has a value of 1, the coding unit is split by a binary tree partition such that its horizontal size or the vertical size is split into a ratio of 1:1. When the partition ratio information has a value of 2, the coding unit is split by a binary tree partition such that its horizontal size or the vertical size is split into a ratio of 1:3. When the partition ratio information has a value of 3, the coding unit is split by a binary tree partition such that its horizontal size or the vertical size is split into a ratio of 1:7. When the partition ratio information has a value of 4, the coding unit is split by a binary tree partition such that its horizontal size or the vertical size is split into a ratio of 1:15.

In the case of a binary tree partition, other examples of the partition ratio indicated by the partition ratio information will be described below.

When the partition ratio information has a value of 1, the coding unit is split by a binary tree partition such that its horizontal size or the vertical size is split into a ratio of 1:1. When the partition ratio information has a value of 2, the coding unit is split by a binary tree partition such that its horizontal size or the vertical size is split into a ratio of 3:1. When the partition ratio information has a value of 3, the coding unit is split by a binary tree partition such that its horizontal size or the vertical size is split into a ratio of 1:3.

In the case of a ternary tree partition, examples of the partition ratio indicated by the partition ratio information will be described below.

When the partition ratio information has a value of 1, the coding unit is split by a ternary tree partition such that its horizontal size or the vertical size is split into a ratio of 1:2:1. When the partition ratio information has a value of 2, the coding unit is split by a ternary tree partition such that its horizontal size or the vertical size is split into a ratio of 1:4:1. When the partition ratio information has a value of 3, the coding unit is split by a ternary tree partition such that its horizontal size or the vertical size is split into a ratio of 1:6:1. When the partition ratio information has a value of 4, the coding unit is split by a ternary tree partition such that its horizontal size or the vertical size is split into a ratio of 1:8:1.

In the case of a ternary tree partition, other examples of the partition ratio indicated by the partition ratio information will be described below.

When the partition ratio information has a value of 1, the coding unit is split by a ternary tree partition such that its horizontal size or the vertical size is split into a ratio of 1:2:1. When the partition ratio information has a value of 2, the coding unit is split by a ternary tree partition such that its horizontal size or the vertical size is split into a ratio of 2:1:1. When the partition ratio information has a value of 3, the coding unit is split by a ternary tree partition such that its horizontal size or the vertical size is split into a ratio of 1:1:2. When the partition ratio information has a value of 4, the coding unit is split by a binary tree partition such that its horizontal size or the vertical size is split into a ratio of 1:3. That is, the partition ratio information for a ternary tree partition may be used to indicate the partition ratio information for a binary tree partition.

The partition ratio information may be a flag or index having a predetermined length (for example, 1 bit) or an index having a variable length.

The relationship between the values of the partition ratio information and the partition ratios are not limited to the above-described examples. When the partition ratio information has a specific value, it means that a coding unit is split by a binary tree partition or a ternary tree partition into a ratio of n:m or into a ratio of n:m:r. The ratio may be diversely set.

Partitioning in the case where there is no priority between a quad tree partition and a ternary tree partition may also be referred to as multi-tree partitioning. That is, a coding unit corresponding to a leaf node of a binary tree may become the root node of a multi-type tree. To split a coding unit corresponding to each node of a multi-type tree, at least one type of information selected from among information indicating whether to apply a multi-type tree partition, partition direction information, partition ratio information, and partition tree information may be signaled.

Partitioning in the case where there is no priority between a quad tree partition and a ternary tree partition may also be referred to as multi-tree partitioning. That is, a coding unit corresponding to a leaf node of a binary tree may become the root node of a multi-type tree. To split a coding unit corresponding to each node of a multi-type tree, at least one type of information selected from among information indicating whether to apply a multi-type tree partition, partition direction information, partition ratio information, and partition tree information may be signaled.

At least any one of the quad tree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad tree partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

A coding unit that is additionally split M times by a quad tree partition, a binary tree partition, and/or a ternary tree partition may become a basic unit for encoding, prediction, and transform. That is, in order to perform prediction and/or transform, a coding unit may be split additionally M times. In this case, a coding unit that is additionally split M times may be used only in an encoding/decoding process but the coding unit may not be split in a block structure. Therefore, a partition structure, partition information, etc. used to further split a coding unit into prediction units and/or transform units may not be inserted into a bitstream. Here, the M is a positive integer and is, for example, 1.

For example, a coding unit may be further split M times and N times so as to be used in the prediction process and/or the transform process. For example, the M and N are the same value or different values.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block.

Here, at least one of the size of a coding unit and the size of a maximum transform block may mean a horizontal size, a vertical size, or an area. Here, at least one of the size of the coding unit and the size of the maximum transform block may mean depth information specifying the size of the coding unit or block. Alternatively, it may mean the ratio of the horizontal size and the vertical size. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

When the size of the coding unit is larger than the size of the maximum transform block, the value of the coded block flag (CBF) of the coding unit may be determined to be a first value according to at least one of the slice type and the partition information. Here, the first value may be 0 indicating that no transform coefficient or no quantized level exists in the coding unit.

In this case, the slice type may be a P slice or a B slice. Here, the partition information may have a first value of 0 (or a second value of 1) indicating that the coding unit is not to be split.

For example, when the current slice is a B slice, the size of the coding unit is 128×128, the size of the maximum transform block is 64×64, and the partition information is 0, the coded block flag (CBF) value of the coding unit may be determined to be 0.

For example, when the current slice is an I slice, the size of the coding unit is 128×128, the size of the maximum transform block is 64×64, and the partition information is 0, the CBF value of the coding unit may be determined to be 0.

For example, when the current slice is a P slice, the size of the coding unit is 64×128, the size of the maximum transform block is 64×64, and the partition information is 0, the CBF value of the coding unit may be determined to be 0.

For example, when the current slice is a P slice, the size of the coding unit is 64×32, the size of the maximum transform block is 32×16, and the partition information is 0, the CBF value of the coding unit may be determined to be 0.

For example, when the current slice is a B slice, the size of the coding unit is 128×128, the size of the maximum transform block is 32×32, and the partition information is 0, the size/the partition information of the coding unit may be additionally entropy-encoded/entropy-decoded.

For example, when the size/the partition information of the coding unit has a first value of 0, the size of the coding unit may be determined to be 128×128, and the CBF value of the coding unit may be determined be 0. For example, when the size/the partition information of the coding unit has a second value of 1, a 128×128 parent coding unit is split into four 64×64 child coding units through a quad tree partition, and the CBF value of the coding unit may be determined be 0. That is, when the horizontal size or the vertical size of the coding unit is four times larger than the horizontal size or the vertical size of the maximum transform block, the size the partition information of the coding unit may be further entropy-encoded/entropy-decoded, and the size of the coding unit having a CBF value of 0 may be determined.

For example, when the current slice is a B slice, the size of the coding unit is 128×64, the size of the maximum transform block is 32×16, and the partition information is 0, the size/the partition information of the coding unit may be further entropy-encoded/entropy-decoded.

For example, when the size/the partition information of the coding unit has a first value of 0, the size of the coding unit may be determined to be 128×64, and the CBF value of the coding unit may be determined be 0. For example, when the size/the partition information of the coding unit has a second value of 1, a 128×64 parent coding unit is split into four 64×32 child coding units through a quad tree partition, and the CBF value of the coding unit may be determined be 0.

When the size of the coding unit is larger than the size of the maximum transform block, the mode of the coding unit may be determined to be skip mode or AMVP mode in which the coded block flag (CBF) has a first value and the motion vector difference value is signaled, according to the slice type. In this case, the slice type may be a P slice or a B slice.

For example, when the current slice is a B slice, the size of the coding unit is 128×128, the size of the maximum transform block is 64×64, and the partition information is 0, the mode of the coding unit may be determined to be skip mode.

For example, when the current slice is a P slice, the size of the coding unit is 64×128, the size of the maximum transform block is 64×64, and the partition information is 0, the mode of the coding unit may be determined to be AMVP mode in which the CBF value is 0.

For example, when the current slice is a B slice, the size of the coding unit is 128×128, the size of the maximum transform block is 32×32, and the partition information is 0, the size/the partition information of the coding unit may be additionally entropy-encoded/entropy-decoded.

For example, when the size/the partition information of the coding unit has a first value of 0, the size of the coding unit may be determined to be 128×128 and the mode of the coding unit may be determined be skip mode. For example, when the size/the partition information of the coding unit has a second value of 1, a 128×128 coding unit may be split into four 64×64 coding units through a quad tree partition, and the mode of the coding unit may be determined to be skip mode.

For example, when the current slice is a P slice, the size of the coding unit is 128×64, the size of the maximum transform block is 32×16, and the partition information is 0, the size/the partition information of the coding unit may be additionally entropy-encoded/entropy-decoded.

For example, when the size/the partition information of the coding unit has a first value of 0, the size of the coding unit may be determined to be 128×64, and the mode of the coding unit may be determined to be AVMP mode in which the CBF value is 0. For example, when the size/the partition information of the coding unit has a second value of 1, a 128×64 coding unit is split into four 64×32 coding units through a quad tree partition, and the mode of the coding unit may be determined to be AVMP mode in which the CBF value is 0.

Here, at least one of the size of the coding unit and the size of the maximum transform block may be a value preset in the encoder/decoder or may be a value signaled from the encoder to the decoder.

When the depth of the coding unit is 0 and the partition information is 0, the CBF value of the coding unit is determined to be 1.

When the depth of the coding unit 0 and the partition information is 0, the mode of the coding unit may be determined to be skip mode or AVMP mode in which the coded block flag (CBF) has a first value and the motion vector difference value is signaled.

In the above description, the coded block flag may include at least one of a coded block flag for the luma signal and coded block flags for the chroma signals.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4. Here, the maximum and/or minimum size information of the coding unit and the maximum and/or minimum size information of the transform block are values signaled for an intra slice and an inter slice, or values signaled regardless of the slice type.

The maximum and/or minimum size information of the coding unit may be signaled in association with the partition tree type of the current block. For example, when the partition tree type of the current coding unit is any one tree among a quad tree, a binary tree, and a ternary tree, the maximum and/or minimum size information of each tree-type coding unit may be signaled.

Here, the maximum and/or minimum size information of a specific tree-type coding unit may be signaled in association with the maximum and/or minimum size information of a general coding unit.

Here, the maximum and/or minimum size information of a specific tree-type coding unit may be signaled in association with the maximum and/or minimum size information of another specific tree-type coding unit.

Here, the maximum and/or minimum size information of a specific tree-type coding unit may be signaled in the form of the value of a logarithm. For example, the exponent in the logarithm may be 2.

Here, the maximum and/or minimum size information of each specific tree-type coding unit may be signaled for each of the luma and chroma components. Hereinbelow, a value represented by Y or luma means information on a luma unit and information represented by C or chroma means information on chroma units.

For example, a difference between the minimum size of a quad tree coding unit and the minimum size of a general coding unit may be signaled. For example, the difference between the minimum size of the quad tree coding unit and the minimum size of the general coding unit may be signaled via slice_log 2_diff_min_qt_min_cb_luma or slice_log 2_diff_min_qt_min_cb_chroma. For example, the minimum size MinQtSizeY or MinQtSizeC of the quad tree coding unit may be derived from the slice_log 2 diff_min_qt_min_cb_luma or slice_log 2_diff_min_qt_min_cb_chroma and the minimum size MinCb Log 2SizeY of the general coding unit. Hereinbelow, a case where the quad tree coding unit has the minimum size may be a case where the quad tree coding unit corresponds to a leaf node of a quad tree.

Alternatively, for example, a difference between the maximum size of a binary tree coding unit and the minimum size of a quad tree coding unit may be signaled. For example, the difference between the maximum size of the binary tree coding unit and the minimum size of the quad tree coding unit may be signaled via slice_log 2_diff_max_bt_min_qt_luma or slice_log 2_diff_max_bt_min_qt_chroma. The maximum size MaxBtSizeY or MaxBtSizeC of the binary tree coding unit may be derived from the slice_log 2_diff_max_bt_min_qt_luma or the slice_log 2_diff_max_bt_min_qt_chroma and the minimum size MinQt Log 2SizeY or MinQt Log 2SizeC of the quad tree coding unit. On the other hand, the decoder may derive the minimum size MinBtSizeY or MinBtSizeC of the binary tree coding unit from the minimum size MinCb Log 2SizeY of the general coding unit.

Alternatively, for example, a difference between the maximum size of a ternary tree coding unit and the minimum size of a quad tree coding unit may be signaled. For example, the difference between the maximum size of the ternary tree coding unit and the minimum size of the quad tree coding unit may be signaled via slice_log 2_diff_max_tt_min_qt_luma or slice_log 2_diff_max_tt_min_qt_chroma. The maximum size (MaxTtSizeY or MaxTtSizeC) of the ternary tree coding unit may be derived from the slice_log 2_diff_max_tt_min_qt_luma or the slice_log 2_diff_max_tt_min_qt_chroma and the minimum size (MinQt Log 2SizeY or MinQt Log 2SizeC)) of the quad tree coding unit. On the other hand, the decoder may derive the minimum size (MinTtSizeY or MinTtSizeC) of the ternary tree coding unit from the minimum size (MinCb Log 2SizeY) of the general coding unit.

Information on the minimum size (quad tree minimum size) of a coding unit corresponding to a leaf node of a quad tree and/or information on the maximum depth (multi-type tree maximum depth) of a multi-type tree from the root node to the leaf node is signaled or determined at a higher level of the coding unit. The higher level may be, for example, a sequence level, a picture level, a slice level, a tile group level, a tile level, and the like. Here, the information on the quad tree minimum size and/or the information on the multi-type tree maximum depth is determined to be values that are signaled for an intra slice and an inter slice, respectively, or determined to be values that that are signaled regardless of the slice type. The multi-type tree maximum depth information may be divided into binary tree maximum depth information and ternary tree maximum depth information and may be signaled or determined at a higher level of the coding unit.

Here, the multi-type tree maximum depth information may be signaled in association with the maximum size information and/or the minimum size information of a general coding unit.

Here, the multi-type tree maximum depth information may be signaled in the form of the value of a logarithm. For example, the exponent in the logarithm may be 2.

Here, the multi-type tree maximum depth information may be separately signaled for the luma component and for the chroma components. Hereinbelow, a value represented by Y or luma means information on a luma unit and information represented by C or chroma means information on chroma units.

Here, the multi-type tree maximum depth information may be signaled. For example, the multi-type tree maximum depth information may be signaled via slice_max_mtt_hierarchy_depth_luma or slice_max_mtt_hierarchy_depth_luma_chroma. The value of the slice_max_mtt_hierarchy_depth_luma or slice_max_mtt_hierarchy_depth_luma_chroma may range from 0 to the resulting value of an equation of Ctb Log 2SizeY−MinCb Log 2SizeY. The decoder may derive the maximum depth (MaxMttDepthY or MaxMttDepthC) from the slice_max_mtt_hierarchy_depth_luma or from the slice_max_mtt_hierarchy_depth_luma_chroma.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. The value of the maximum size (binary tree maximum size) of a coding unit corresponding to each node of a binary tree varies depending on the slice type. For example, when the slice type is an intra slice, the maximum size of a binary tree may be 32×32. For example, when the slice type is an inter slice, the maximum size of a binary tree may be 128×128. Information on the maximum size (ternary tree maximum size) of a coding unit corresponding to each node of a ternary tree may be determined on the basis of the size of the coding unit and the difference information. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

For example, the binary tree maximum size and/or the ternary tree maximum size may be signaled or determined at a sequence level or a picture level. For example, the binary tree minimum size and/or the ternary tree minimum size may be signaled or determined at a sequence level or a picture level.

For example, the binary tree maximum depth and/or the ternary tree maximum depth may be signaled or determined at a sequence level, a picture level, or a slice level. For example, the binary tree minimum depth and/or the ternary tree minimum depth may be signaled or determined at a sequence level, a picture level, or a slice level.

Depending on size and depth information of the above-described various blocks, quad tree partition information, multi-type tree partition indication information, partition tree information and/or partition direction information may be included or may not be included in a bit stream.

For example, when the size of the coding unit is not larger than the minimum size of a quad tree, the coding unit does not contain quad tree partition information. Thus, the quad tree partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

When at least either one of the vertical size and the horizontal size of the unit or block is not the n-th power of 2 (=$2^n$), the unit or block nay be encoded/decoded such that no residual signal exists.

For example, the coded block flag (CBF) of the unit or block may not be entropy-encoded/entropy-decoded but may be inferred to be zero.

For example, the skip mode flag of the coding mode of the unit or block may not be entropy-encoded/entropy-decoded, and the coding mode of the unit or block may be inferred to be skip mode.

Accordingly, transform/inverse-transform may not be performed on blocks at least either one of the vertical size and the horizontal size of which is not the n-th power of 2 (=$2^n$). That is, at least either one of the transform matrix and the inverse-transform matrix which are in the form of the n-th power of 2 may not be required.

When the current block includes a boundary of a picture, a sub-picture, a slice, a tile, or a brick, the current block may be implicitly partitioned. In the following description, the boundary may mean at least one of the boundaries of a picture, a sub-picture, a slice, a tile, and a brick. In this case, the boundary may mean at least one of the right boundaries, the lower boundaries, the upper boundaries, and the left boundaries of a picture, a sub-picture, a slice, a tile, and a brick. Here, the implicit partitioning may mean a case where a certain block is partitioned by a specific partitioning method without a coding parameter that is signaled.

The right boundary or the left boundary may mean a vertical boundary. The lower boundary or the upper boundary may mean a horizontal boundary.

When the boundary included in the current block is a vertical boundary or a horizontal boundary, the current block may be partitioned only vertically or horizontally. The implicit partitioning of the current block may be performed according to the size of the current block.

When the implicit partitioning is performed, only a specific partition may be performed, and only specific partition information may be entropy-encoded/entropy-decoded. The specific partition is determined according to whether the boundary included in the current block is the vertical boundary or the horizontal boundary. The specific partition may be any one partition type selected from among a quad tree partition, a horizontal binary tree partition, a vertical binary tree partition, a horizontal ternary tree partition, and a vertical ternary tree partition.

For example, when the current block includes the vertical boundary, at least one of the quad tree partitioning, the vertical binary tree partitioning, and the vertical ternary tree partitioning may be performed such that each of the blocks resulting from the partitioning of the current block does not extend across the vertical boundary.

For example, when the current block includes the horizontal boundary, at least one of the quad tree partitioning, the horizontal binary tree partitioning, and the horizontal ternary tree partitioning may be performed such that each of the blocks resulting from the partitioning of the current block does not extend across the horizontal boundary.

For example, when the current block includes the right boundary, the partitioning of the current block may be restricted such that only the vertical binary tree partitioning of the current block is possible. In this case, the vertical binary tree partitioning may be implicitly performed on the current block. In this case, the partition information on the vertical binary tree partitioning may be entropy-encoded/entropy-decoded. In this case, information on the other types of partitioning except for the binary tree partitioning may not be entropy-encoded/entropy-decoded.

Specifically, when the current block includes the right boundary and the height of the current block exceeds the maximum transform block size, the partitioning of the current block may be restricted such that the vertical binary tree partitioning is prevented.

For example, when the current block includes the right boundary and the height of the current block exceeds 64 which is the maximum transform block size, the partitioning of the current block may be restricted such that the vertical binary tree partitioning is prevented.

For example, when the current block includes the right boundary but does not include the lower boundary, the partitioning of the current block may be restricted such that the horizontal binary tree partitioning is prevented.

For example, when the current block includes the lower boundary, the partitioning of the current block may be restricted such that only the horizontal binary tree partitioning is possible. In this case, the horizontal binary tree partitioning may be implicitly performed on the current block. In this case, the horizontal binary tree partition information on the current block may be entropy-encoded/entropy-decoded. In this case, information on the other types of partitioning except for the horizontal binary tree partitioning may not be entropy-encoded/entropy-decoded.

Specifically, when the current block includes the lower boundary, the partitioning of the current block may be restricted such that the vertical binary tree partitioning is prevented.

In addition, when the current block includes the lower boundary and the width of the current block exceeds the maximum transform block size, the partitioning of the current block may be restricted such that the horizontal binary tree partitioning is prevented.

For example, when the current block includes the lower boundary and the width of the current block exceeds 64 which is the maximum transform block size, the partitioning of the current block may be restricted such that the horizontal binary tree partitioning is prevented.

For example, when the current block includes the right boundary, the partitioning of the current block may be restricted such that only the vertical ternary tree partitioning of the current block is allowed. In this case, the vertical ternary tree partitioning may be implicitly performed on the current block. In this case, the vertical ternary tree partition information on the current block may be entropy-encoded/entropy-decoded. In this case, information on the other types of partitioning except for the vertical ternary tree partitioning may not be entropy-encoded/entropy-decoded.

For example, when the current block includes the lower boundary, the partitioning of the current block may be restricted such that only the horizontal ternary tree partitioning is allowed. In this case, the horizontal ternary tree partitioning may be implicitly performed on the current block. In this case, the horizontal ternary tree partition information on the current block may be entropy-encoded/entropy-decoded. In this case, information on the other types of partitioning except for the horizontal ternary tree partitioning may not be entropy-encoded/entropy-decoded.

For example, when the current block includes at least either the right boundary or the upper boundary, the partitioning of the current block may be restricted such that the ternary tree partitioning is prevented.

For example, when the current block includes both the right boundary and the lower boundary, the partitioning of the current block may be restricted such that only the quad tree partitioning is allowed. In this case, the quad tree partitioning may be implicitly performed on the current block. In this case, the quad tree partition information on the current block may be entropy-encoded/entropy-decoded. In this case, information on the other types of partitioning except for the quad tree partitioning may not be entropy-encoded/entropy-decoded.

When the current block is partitioned, the partitioning of the current block may be restricted such that an aspect ratio (horizontal size to vertical size) of each of the resulting child blocks is not a specific ratio. That is, the partitioning of the current block may be restricted such that the aspect ratio (horizontal size to vertical size) of each of the resulting child blocks is equal to or smaller than a specific ratio. For example, the aspect ratio of the horizontal size and the vertical size may be 1:N. That is, the ratio of the vertical size and the horizontal size may be N:1. Here, the N may be a positive integer of 4, 5, 6, 7, 8, and so forth. Here, V may be determined on the basis of at least one of the coding parameters of the current block and the coding parameters of a candidate block. In this case, the N may be a value preset in the encoder/decoder or a value signaled from the encoder to the decoder.

The ratio of each of the child blocks resulting from the partitioning of the current block is increased in comparison with the specific ratio, the partition information on the child blocks may not be entropy-encoded/entropy-decoded.

In order to determine the partition tree structure of the current block, the syntaxes described below may be determined.

For example, qtbtt_dual_tree_intra_flag may mean that each CTU in an I slice is split into 64×64 coding units and each of the 64×64 coding units serves as the root node of the luma and chroma components.

For example, the qtbtt_dual_tree_intra_flag having a first value (for example, 0) may mean that each CTU is split into 64×64 coding units and each 64×64 coding unit is used as neither the root node of the luma component nor the root node of the chroma components, and the qtbtt_dual_tree_intra_flag having a second value (for example, 1) may mean that each CTU is split into 64×64 coding units and each 64×64 coding unit is used as the root node of the luma component and the root node of the chroma components.

When the qtbtt_dual_tree_intra_flag has a first value (for example, 0), the block partition stricture of the luma component and the block partition structure of the chroma components may be the same. However, depending on the tree type of the chroma component, the block size of the luma component may be different from the block size of the chroma component. This case is referred to as a case where a single tree structure is used. The single tree type is identified from the expression "SINGLE_TREE".

When the slice type is an I slice and the qtbtt_dual_tree_intra_flag has a second value (for example, 1), the block partition structure of the luma component and the block partition structure of the chroma components derived from the 64×64 coding unit may be different from each other. This case is referred to as a case where a dual tree structure is used. In the case of the dual tree structure, the tree type of the luma component can be identified from the expression "DUAL_TREE_LUMA" and the tree type of the chroma component can be identified from the expression "DUAL_TREE_CHROMA".

In the case of the single tree structure, the minimum block of the chroma component may be set to a 2×2 block. In this case, for the chroma components, blocks smaller than a 2×2 block may not be used. That is, for the chroma components, partitioning a parent block larger than a 2×2 block into child blocks smaller than a 2×2 block is not allowed.

In the case of the single tree structure, the minimum block of the chroma component may be set to a 4×4 block. In this case, for the chroma components, 2×2 blocks, 2×4 blocks, and 4×2 blocks may not be used. That is, block partitioning from a block larger than at least one of a 2×2 block, a 2×4 block, and a 4×2 block into at least one of a 2×2 block, a 2×4 block, and a 4×2 block may not be allowed.

In the case of the dual tree structure, the minimum block of the chroma component may be set to a 4×4 block. In this case, for the chroma components, 2×2 blocks, 2×4 blocks, and 4×2 blocks may not be used. That is, block partitioning from a block larger than at least one of a 2×2 block, a 2×4 block, and a 4×2 block into at least one of a 2×2 block, a 2×4 block, and a 4×2 block may not be allowed.

Figure 4:
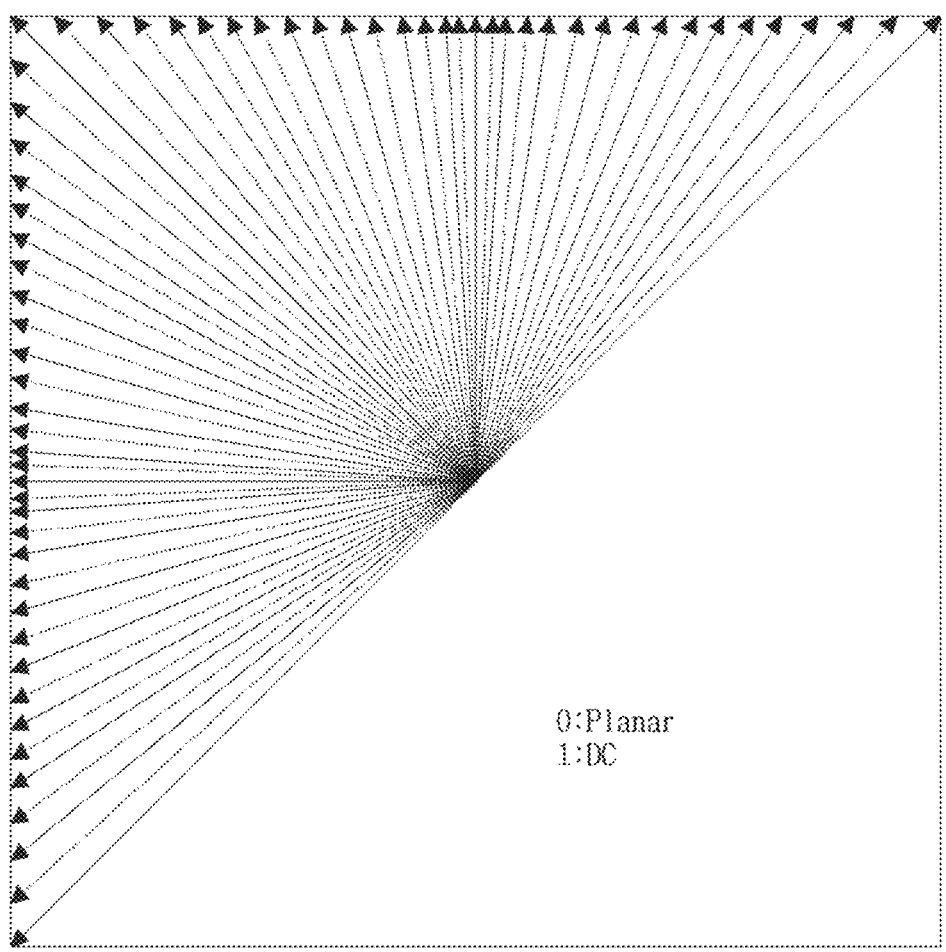
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or preforming interpolation on at least one sample value among samples included in the reconstructed neighbor block or both may be used to replace with a non-usable sample value of a sample, thus the replaced sample value is used as a reference sample of the current block.

Figure 7:
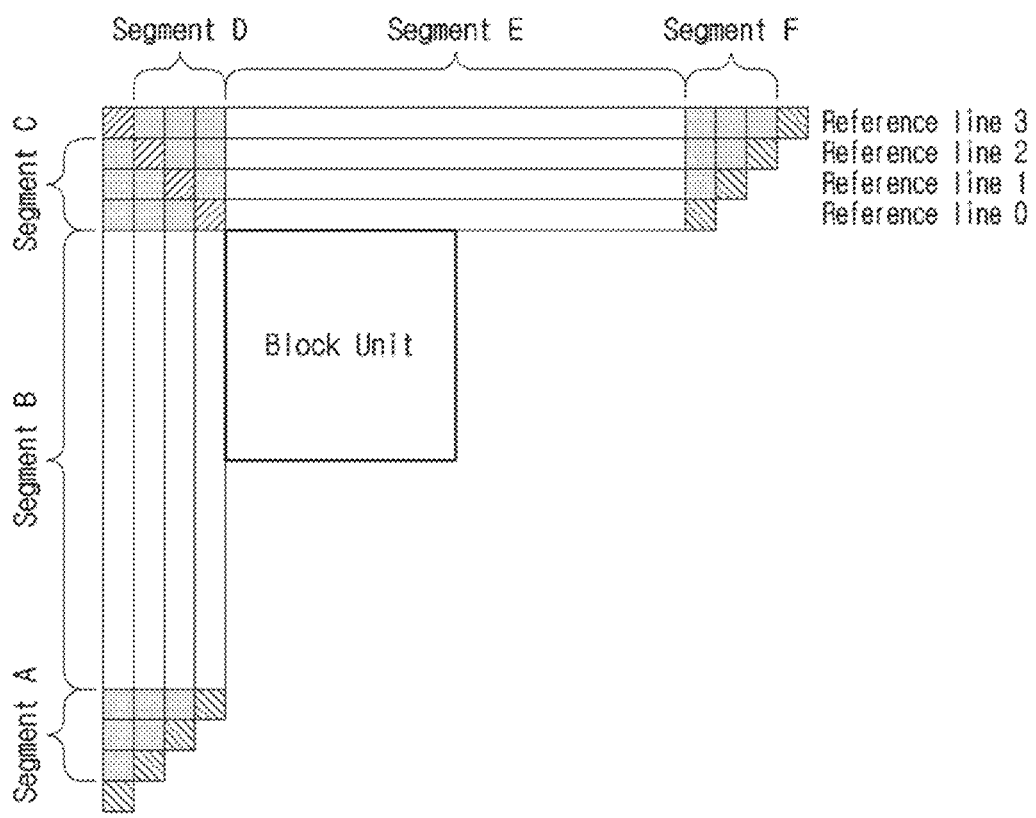
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
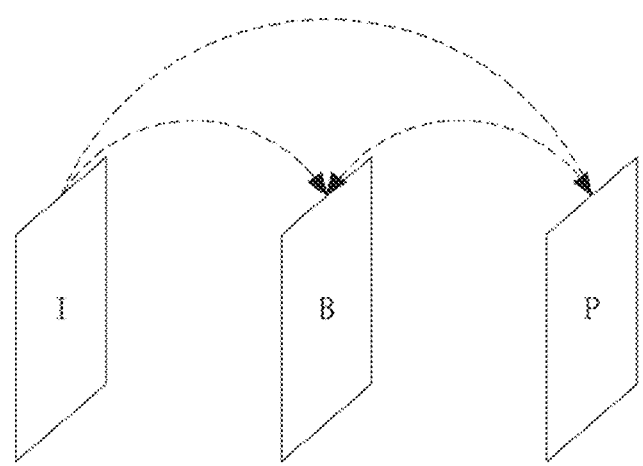
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangular partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
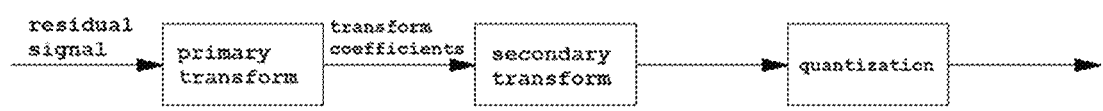
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of preforming the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, an image encoding/decoding method according to the present invention will be described on the basis of the matters described above.

Hereinafter, an embodiment of using coding parameters of neighboring blocks to encode/decode a current block will be described.

For example, in the abovedescribed block partition structure, at least one of the coding parameters of a neighboring block may be used as at least one of the coding parameters of a current block.

For example, at least one type of information of a neighboring block, which is selected from among unit partition information, whether a quad tree partition is performed, whether a binary tree partition is performed, partition direction for a binary tree partition (vertical or horizontal), partition type of a binary tree partition (symmetric or asymmetric), partition ratio of a binary tree partition, whether a ternary tree partition is performed, partition direction for a ternary tree partition (vertical or horizontal), partition type of a ternary tree partition (symmetric or asymmetric), and partition ratio of a ternary tree partition may be used as at least one type of information of the current block, which is selected from among unit partition information, whether a quad tree partition is performed, whether a binary tree partition is performed, partition direction for a binary tree partition (vertical or horizontal), partition type of a binary tree partition (symmetric or asymmetric), partition ratio of a binary tree partition, whether a ternary tree partition is performed, partition direction for a ternary tree partition (vertical or horizontal), partition type of a ternary tree partition (symmetric or asymmetric), and partition ratio of a ternary tree partition.

For example, in the above-described block partition structure, at least one of the coding parameters of a neighboring block may be used to derive at least one of the coding parameters of the current block.

For example, at least one type of information on a neighboring block, which is selected from among unit partition information, whether a quad tree partition is performed, whether a binary tree partition is performed, binary tree partitioning direction, binary tree partition type, partition ratio of the binary tree partition, whether a ternary tree partition is performed, ternary tree partitioning direction, ternary tree partition type, and partition ratio of the ternary tree partition may be used to derive at least one type of information of the current block, which is selected from among unit partition information, whether a quad tree partition is performed, whether a binary tree partition is performed, partitioning direction of the binary tree partition (vertical or horizontal), partition type of the binary tree partition (symmetric or asymmetric), partition ratio of the binary tree partition, whether a ternary tree partition is performed, partitioning direction of the ternary tree partition (vertical or horizontal), partition type of the ternary tree partition (symmetric or asymmetric), and partition ratio of the ternary tree partition.

Here, the case where at least one of the coding parameters of a neighboring block is used to derive at least one of the coding parameters of the current block may mean that at least one of the coding parameters of the current block is determined or derived using at least one of the coding parameters of a neighboring block.

For example, in the above-described block partition structure, at least one of the coding parameters of a neighboring block may be used to drive at least one of the coding parameters of another neighboring block.

For example, at least one type of information on a neighboring block, which is selected from among unit partition information, whether a quad tree partition is performed, whether a binary tree partition is performed, binary tree partitioning direction, binary tree partition type, partition ratio of the binary tree partition, whether a ternary tree partition is performed, ternary tree partitioning direction, ternary tree partition type, and partition ratio of the ternary tree partition may be used to derive at least one type of information of another neighboring block, which is selected from among unit partition information, whether a quad tree partition is performed, whether a binary tree partition is performed, partitioning direction of the binary tree partition (vertical or horizontal), partition type of the binary tree partition (symmetric or asymmetric), partition ratio of the binary tree partition, whether a ternary tree partition is performed, partitioning direction of the ternary tree partition (vertical or horizontal), partition type of the ternary tree partition (symmetric or asymmetric), and partition ratio of the ternary tree partition.

Here, the case where at least one of the coding parameters of a neighboring block is used to derive at least one of the coding parameters of another neighboring block may mean that at least one of the coding parameters of another neighboring block is determined or derived using at least one of the coding parameters of a neighboring block.

For example, in the above-described block partition structure, at least one of the coding parameters of a neighboring block may be used in the process of performing intra prediction on the current block.

For example, at least one type of information selected from among an intra prediction mode, an intra prediction direction, a reference sample filtering method, a prediction block filtering method, a prediction block filter tap, and prediction block filter coefficients of a neighboring block may be used in the process of performing intra prediction on the current block.

For example, in the above-described block partition structure, at least one of the coding parameters of a neighboring block may be used in the process of performing inter prediction or motion compensation on the current block.

For example, at least one of an inter prediction mode, motion information, a motion vector, a reference picture index, an inter prediction direction, an inter prediction indicator, a reference picture list, a motion vector predictor, a motion vector candidate list, merge mode utilization information, a merge candidate, a merge candidate list, skip mode utilization information, an interpolation filter type, an interpolation filter tap, an interpolation filter coefficient, a motion vector size, a motion vector representation accuracy of a neighboring block may be used in the process of performing inter prediction or motion compensation on the current block.

For example, in the above-described block partition structure, at least one of the coding parameters of a neighboring block may be used in the process of performing transform, inverse transform, quantization, or dequantization on the current block. Here, the transform and the inverse transform may include at least one of primary transform, secondary transform, primary inverse transform, and secondary inverse transform.

For example, at least one type of information selected from among transform type, transform size, information on utilization of primary transform, information on utilization of secondary transform, primary transform index, secondary transform index, residual signal presence information, coded block pattern, coded block flag, quantization parameter and quantization matrix may be used for transform, inverse transform, quantization, or dequantization of the current block.

For example, in the above-described block partition structure, at least one of the coding parameters of a neighboring block may be used for entropy-encoding/entropy-decoding of the current block.

For example, at least one type of information on a neighboring block, which is selected from among unit partition information, whether a quad tree partition is performed, whether a binary tree partition is performed, binary tree partition direction, binary tree partition type, partition ratio of the binary tree partition, whether a ternary tree partition is performed, ternary tree partition direction, ternary tree partition type, and partition ratio of the ternary tree partition may be used to entropy-encode/entropy-decode at least one type of information of the current block, which is selected from among unit partition information, whether a quad tree partition is performed, whether a binary tree partition is performed, partition direction of the binary tree partition (vertical or horizontal), partition type of the binary tree partition (symmetric or asymmetric), partition ratio of the binary tree partition, whether a ternary tree partition is performed, partition direction of the ternary tree partition (vertical or horizontal), partition type of the ternary tree partition (symmetric or asymmetric), and partition ratio of the ternary tree partition. Here, entropy-encoding/entropy-decoding may include processes of determining a binarization/debinarization method, determining a context model, updating a context model, performing a regular mode, and performing a bypass mode.

As another example, at least one of the coding parameters of a neighboring block in the aforementioned block partition structure may be used for filtering of the current block using an intra loop filter, a deblocking filter, an adaptive sample offset, an adaptive in-loop filter, etc.

For example, information on a neighboring block, which is selected from among including whether an intra loop filter is applied, the intra loop filter coefficients, the intra loop filter tap, the intra loop filter shape, the intra loop filter type, whether a deblocking filter is applied, the deblocking filter coefficients, the deblocking filter tap, the deblocking filter strength, the deblocking filter shape, the deblocking filter type, whether an adaptive sample offset is applied, the adaptive sample offset value, the adaptive sample offset category, the adaptive sample offset type, whether an adaptive in-loop filter is applied, the adaptive in-loop filter coefficients, the adaptive in-loop filter tap, the adaptive in-loop filter shape, and the adaptive in-loop filter type may be used in the filtering of the current block such as the deblocking filtering, the adaptive sample offset filtering, the adaptive in-loop filtering, etc.

As another example, at least one of the coding parameters of a neighboring block in the aforementioned block partition structure may be used for at least one of the intra prediction of the current block, the inter prediction or motion compensation of the current block, the entropy-encoding/entropy-decoding of the current block, and the filtering of the current block using an intra loop filter, a deblocking filter, an adaptive sample offset, an adaptive in-loop filter, etc.

For example, in the above-described block partition structure, at least one of the coding parameters of a luma signal block may be used as at least one of the coding parameters of a chroma signal block. For example, in the above-described block partition structure, at least one of the coding parameters of a luma signal block may be used to derive as at least one of the coding parameters of a chroma signal block. As another example, at least one of the coding parameters of a luma signal block in the aforementioned block partition structure may be used for at least one of the intra prediction of a chroma signal block, the inter prediction or motion compensation of a chroma signal block, the entropy-encoding/entropy-decoding of a chroma signal block, and the filtering of a chroma signal block using an intra loop filter, a deblocking filter, an adaptive sample offset, an adaptive in-loop filter, etc.

For example, in the abovedescribed block partition structure, at least one of the coding parameters of a Cb/Cr signal block may be used as at least one of the coding parameters of a Cr/Cb signal block. For example, in the above-described block partition structure, at least one of the coding parameters of a Cb/Cr signal block may be used to derive as at least one of the coding parameters of a Cr/Cb signal block. As another example, at least one of the coding parameters of a Cb/Cr signal block in the aforementioned block partition structure may be used for at least one of the intra prediction of a Cr/Cb signal block, the inter prediction or motion compensation of a Cr/Cb signal block, the entropy-encoding/entropy-decoding of a Cr/Cb signal block, and the filtering of a Cr/Cb signal block using an intra loop filter, a deblocking filter, an adaptive sample offset, an adaptive in-loop filter, etc.

At least one of the coding parameters and the information described below may be entropy-encoded/entropy-decoded for each block generated by block partitioning based on the block partition structure. In addition, a method indicated by the information described below may be performed according to at least one piece of information that is entropy-encoded/decoded and/or at least one of the block size and the block shape.

For example, the motion information may include at least one piece of information selected from among a motion vector, a reference picture index, an inter prediction indicator, skip mode utilization information (skip_flag), merge mode utilization information (merge_flag), merge index information (merge index), and motion vector resolution information, overlapped block motion compensation information, local illumination compensation information, affine motion compensation information, decoder-side motion vector derivation information, and bi-directional optical flow information.

The motion vector resolution information may be information indicating whether a specific resolution is used for at least one of a motion vector and a motion vector difference value. Here, the resolution may mean precision. In addition, the specific resolution may be set to any one unit selected from among an integer-pixel unit, a ½-pel unit, a ¼-pel unit, a ⅛-pel unit, a 1/16-pel unit, a 1/32-pel unit, and a 1/64-pel unit.

The overlapped block motion compensation information may be information indicating whether a weighted sum of the prediction blocks of the current block is calculated by additionally using a motion vector of a neighboring block spatially adjacent to the current block when motion compensation of the current block is performed.

The local illumination compensation information may be information indicating whether at least one of a weight value and an offset value is applied when generating the prediction block of the current block. Here, the weight value and the offset value may be values calculated using information on the reference block.

The affine motion compensation information may be information indicating whether to use an affine motion model when performing motion compensation on the current block. Here, the affine motion model may be a model that splits one block into a plurality of child blocks using a plurality of parameters and calculates a motion vector of each child block using a representative motion vector.

The decoder-side motion vector derivation information may be information indicating whether a motion vector necessary for motion compensation is derived at the decoder side. The information on the motion vector may not be entropy-encoded/decoded depending on the decoder-side motion vector derivation information. When the decoder-side motion vector derivation information indicates that the decoder derives and uses the motion vector, information on the merge mode may be entropy-encoded/decoded. That is, the decoder-side motion vector derivation information may indicate whether the decoder uses the merge mode.

The bidirectional optical flow information may be information indicating whether motion compensation is performed by refining a motion vector on a pixel basis or a sub-block basis. Depending on the bidirectional optical flow information, the motion vector per pixel or per sub-block may not be entropy-encoded/decoded. Here, the motion vector refinement may refer to a process of changing the motion vector values from a block-based motion vector to a pixel-based motion vector or a sub-block-based motion vector.

When an image is split into prediction units (PUs), transformation units (TUs), prediction blocks (PBs), or transformation blocks (TBs), units or blocks may be generated according to at least one of the embodiments associated with the coding unit.

Hereinafter, a method of determining a reference block of the current block in the above-described block structure will be described.

An image may be encoded/decoded according to at least one or a combination of embodiments described below. By efficiently determining a reference block of the current block in an image encoding/decoding process using the embodiments described below, it is possible to improve coding efficiency of an image encoder and decoding efficiency of an image decoder.

In addition, a block to be described later may mean a unit, and a candidate list to be described later may mean a candidate set including at least one candidate.

Here, at one or more steps among image encoding/decoding process steps including inter prediction, intra prediction, transform, inverse transform, quantization, dequantization, entropy encoding, entropy decoding, and in-loop filtering, a reference block of the current block may be determined.

Figure 8A:
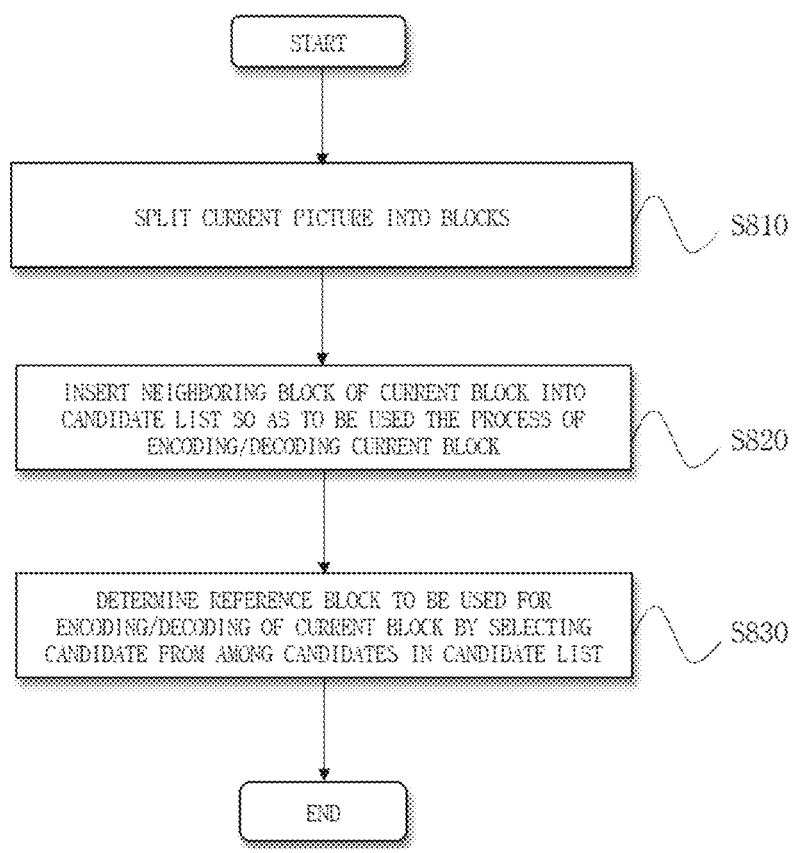
FIGS. 8a to 8c are flowcharts illustrating an image encoding/decoding method according to one embodiment of the present invention.
Figure 8B:
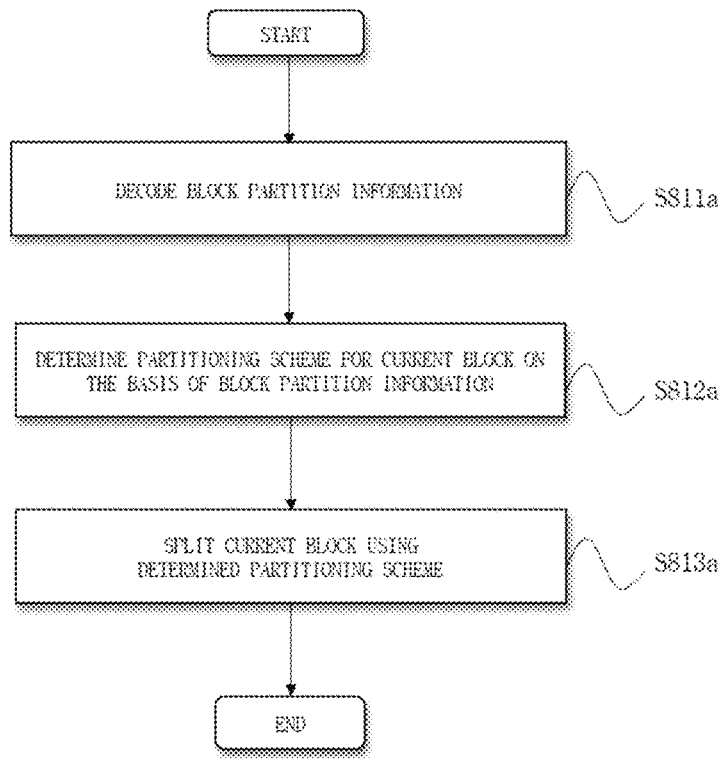
Figure 8C:
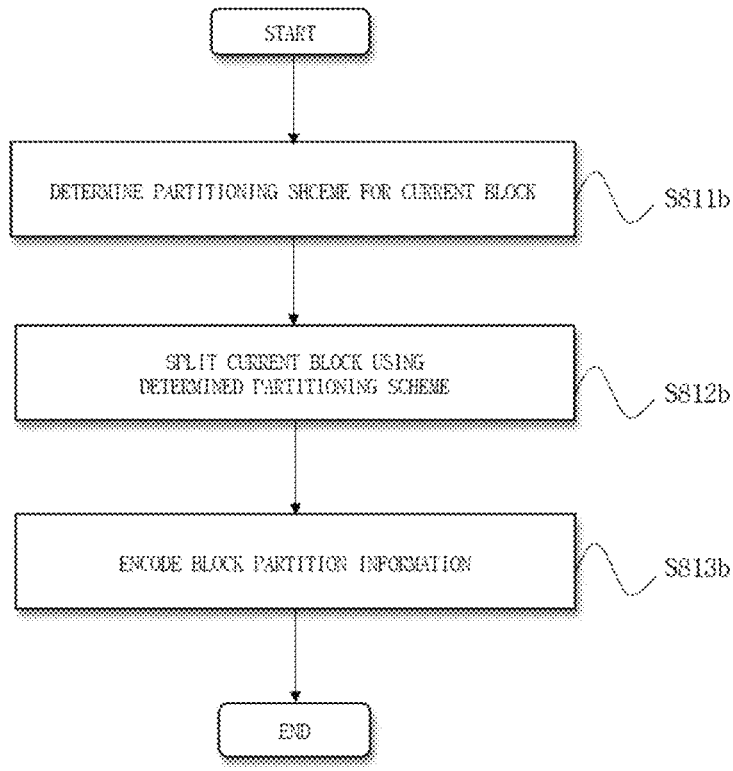

FIGS. 8a to 8c are flowcharts illustrating an image encoding/decoding method according to one embodiment of the present invention.

Referring to FIG. 8a, the image encoding/decoding method according to the present invention includes a step S810 of splitting a current picture into a plurality of blocks, a step S820 of inserting neighboring blocks adjacent to a current block into a candidate list used to encoded/decode the current block, and a step S830 of determining a neighboring block in the candidate list as a reference block used to encoded/decode the current block. The current block in FIG. 8a may mean a decoding target sub-block, which is one of the sub-blocks generated through block partitioning.

In order to split the current picture into a plurality of sub-blocks, at least one of or a combination of embodiments regarding the block partition structure and the partitioning method, which have been described above with reference to FIG. 3, may be used.

In FIGS. 8b and 8c, the current block may mean a current decoding/decoding target block that is included in the current picture and is split into a plurality of sub-blocks.

Referring to FIG. 8b, a method in which a decoding apparatus splits a current picture into a plurality of sub-blocks will be described.

The block partitioning method according to the present invention includes: decoding block partition information on a current block included in a current picture (S811a); determining a partitioning scheme for the current block using the block partition information (S812a), and partitioning the current block using the determined partitioning scheme (S813a).

The partitioning scheme is determined according to whether the current block includes a boundary of the current picture.

Referring to FIG. 8c, a method in which an encoding apparatus splits a current picture into a plurality of sub-blocks will be described.

The block partitioning method according to the present invention includes a step of determining a partitioning scheme for a current block included in a current picture (S811b), a step of partitioning the current block using the determined partitioning scheme (S812b), and a step of encoding block partition information on the current block (S812c).

For example, the partitioning scheme is determined according to whether the current block includes a boundary of the current picture.

A reference block for the current block may be selected from a candidate list including neighboring blocks or block information of neighboring blocks. Here, at one or more steps among image encoding/decoding process steps including inter prediction, intra prediction, transform, inverse transform, quantization, dequantization, entropy encoding, entropy decoding, and in-loop filtering, the current block may be encoded/decoded using the determined reference block.

The reference block may mean at least one piece of block information of the reference block. That is, at least one of the image encoding/decoding processes may be performed on the current block using the determined block information of the reference block. Here, the block information of the reference block may be determined as the block information of the current block. The reference block may mean at least one piece of block information of the reference block.

Herein, the neighboring block of the current block means one of the spatial neighboring blocks including an upper neighboring block adjacent to the upper boundary of the current block, an upper left neighboring block adjacent to the upper left corner of the current block, an upper right neighboring block adjacent to the upper right corner of the current block, a left neighboring block adjacent to the left boundary of the current block, and a lower left neighboring block adjacent to the lower left corner of the current block. In addition, the neighboring block may be at least one of the spatial neighboring blocks adjacent to the boundaries of the current block. The neighboring block refers to a block located outside the boundaries of a CTU to which the current block belongs, and specifically refers to one of spatial neighboring blocks adjacent to the boundaries of the current block. The neighboring block refers to at least one of the spatial neighboring blocks including one or more samples that are located outside the current block and which are adjacent to a specific sample position within the current block. The neighboring block refers to a block that is located outside the boundaries of a CT to which the current block belongs and refers to one of the spatial neighboring blocks including one or more samples that are located outside the current block and which are adjacent to a specific sample position within the current block. That is, the neighboring block may mean a neighboring block spatially/temporally adjacent to the current block and may mean a reconstructed neighboring block.

The neighboring block may mean at least one piece of block information of the neighboring block. That is, the inclusion of the neighboring block in the candidate list may mean that the block information of the neighboring block is included in the candidate list. Therefore, the neighboring block mentioned below may be used as a tem that refers to at least one piece of block information of a neighboring block.

That is, the block may mean a candidate that is a block itself or may mean a candidate that is a piece of the information on a block. In the embodiments described below, for convenience, block information and the corresponding block are collectively called as a block.

The block information may mean at least one of the information on the neighboring block, the information on the reference block, and the information on the current block.

The block information may include at least one of the coding parameters of a block. For example, the block information means information used in at least one of the processes selected from among inter prediction, intra prediction, transform, inverse transform, quantization, dequantization, entropy encoding, entropy decoding, and in-loop filtering. Specifically, the block information refers to any one of or a combination of the following parameters: block size, block depth, block partition information, block form (square or non-square), whether a quad tree partition is performed, whether a binary tree partition is performed, binary tree partition direction (horizontal or vertical), binary tree partition type (symmetric or asymmetric), prediction mode (intra or inter), luma intra prediction mode/direction, chroma intra prediction mode/direction, intra prediction partition information, inter prediction partition information, coded block partition flag, prediction block partition flag, transform block partition flag, reference sample filter tap, reference sample filter coefficient, prediction block filter tap, prediction block filter coefficient, prediction block boundary filter tap, prediction block boundary filter coefficient, motion vector (motion vector for at least one of L0, L1, L2, L3, and the like), motion vector difference (motion vector difference for at least one of L0, L1, L2, L3, and the like), direction of inter prediction (unidirectional or bidirectional), reference picture index (reference picture index for at least one of L0, L1, L2, L3, and the like), inter prediction indicator, prediction list utilization information (whether used or not), reference picture list, motion vector prediction index, motion vector prediction candidate, motion vector candidate list, merge mode information (whether used or not), merge index, merge candidate, merge candidate list, skip mode information (whether used for not), interpolation filter type, interpolation filter tap, interpolation filter coefficient, motion vector size, motion vector precision (integer sample, ½ sample, ¼ sample, ⅛ sample, 1/16 sample, 1/32 sample, etc.), transform type, transform size, primary transform utilization information (whether used or not), secondary transform utilization information (whether used or not), primary transform index, secondary transform index, residual signal presence information (whether exists or not), coding block pattern, coding block flag, coding parameter, residual quantization parameter, quantization matrix, in-picture loop filter application information (whether applied or not), in-picture loop filter coefficient, in-picture loop filter tap, in-picture loop filter shape/form, deblocking filter application information (whether applied or not), deblocking filter coefficient, deblocking filter tap, deblocking filter strength, deblocking filter shape/form, adaptive sample offset (SAO) application information (whether applied or not), adaptive sample offset value, adaptive sample offset category, adaptive sample offset type, adaptive loop filter (ALF) application information (whether applied or not), adaptive loop filter coefficient, adaptive loop filter tap, adaptive loop filter shape/form, binarization/inverse binarization method, context model decision method, context model updating method, regular mode utilization information (whether used or not), bypass mode utilization flag, context bin, bypass bin, significant coefficient flag, last significant coefficient flag, coding flag per coefficient group, position of last significant flag, flag indicating whether coefficient value is greater than 1, flag indicating whether coefficient value is greater than 2, flag indicating whether coefficient value is greater than 3, remaining coefficient value information, sign information, reconstructed luma sample, reconstructed chroma sample, residual luma sample, residual chroma sample, luma transform coefficient, chroma transform coefficient, luma quantization level, chroma quantization level, transform coefficient level scanning method, size of decoder-side motion vector search area, shape of decoder-side motion vector search area, decoder-side motion vector search frequency, CTU size, minimum block size, maximum block size, maximum block depth, minimum block depth, slice identification information, slice partition information, tile identification information, tile type, tile partition information, bit depth of input sample, bit depth of reconstructed sample, bit depth of residual sample, bit depth of transform coefficient; and bit depth of quantization level.

For example, when entropy encoding/decoding quad tree partition information, a context model may be determined by comparing a depth value of the current block and a depth value of the neighboring block.

As another example, when entropy encoding/decoding information of whether to split the current coding unit, a context model may be determined by comparing the height and/or width of the current block with the height and/or width of each neighboring block.

As a further example, when entropy encoding/decoding information of whether to skip decoding of the current coding unit, a context model may be determined in consideration of information of whether the decoding of the neighboring blocks is skipped.

As a further example, when entropy encoding/decoding the prediction mode information of the current coding unit, a context model may be determined in consideration of the prediction modes of the neighboring blocks.

As a further example, when entropy encoding/decoding information of whether to perform an intra block copy (IBC) on the current coding unit, a context model may be determined in consideration of information of whether the IBC is performed on the neighboring blocks.

As a further example, when entropy encoding/decoding information of whether a subblock-based merge mode is to be performed on the current coding unit, a context model may be determined in consideration of information of whether a neighboring block has undergone a subblock-based merge mode and an affine mode.

As a further example, when entropy encoding/decoding information whether an affine mode is performed on the current coding unit, a context model may be determined in consideration of information of whether a neighboring block has undergone a subblock-based merge mode and an affine merge mode.

First, the step S820 of inserting a neighboring block into a candidate list will be described in detail.

At least one neighboring block (up to V neighboring blocks) spatially/temporally adjacent to the current block may be inserted into the candidate list for the current block. At least one piece (a maximum of V pieces) of block information of the neighboring blocks spatially/temporally adjacent to the current block may be inserted into the candidate list for the current block.

Here, the V may be 0 or any positive integer. The V may be determined based on at least one of the coding parameters of the current block and the coding parameters of the candidate. In addition, the V may be a value preset in the encoder/decoder or a value signaled from the encoder to the decoder.

When a neighboring block is included in the same image (picture) as the current block, a sub-picture in the same picture, a slice in the same picture, a tile in the same picture, a brick in the same picture, or a CTU in the same picture, the neighboring block is referred to as a spatial neighboring block that is spatially adjacent to the current block. When a neighboring block is included in a different image from the current block, a slice in a different image, a tile in a different image, or a CTU in a different image, the neighboring block is referred to as a temporal neighboring block that is temporally adjacent to the current block.

Hereinafter, an embodiment of inserting the above-described spatial or temporal neighboring blocks into the candidate list will be described in detail with reference to FIGS. 9 to 23. The encoder or the decoder may add or insert the spatial or temporal neighboring blocks of the current block to or into the candidate list for the current block by using at least one or at least one combination of the methods described below.

Figure 9:
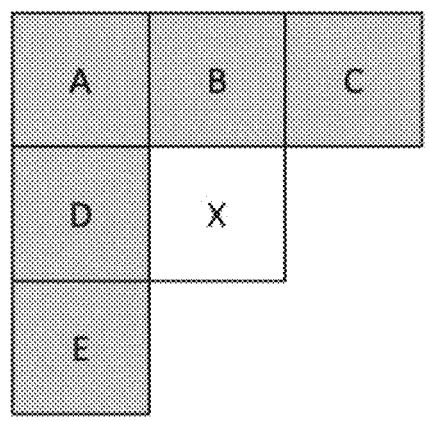
FIGS. 9 and 10 are diagrams illustrating a method of inserting a neighboring block adjacent to a current block into a candidate list according to one embodiment of the present invention.
Figure 10:
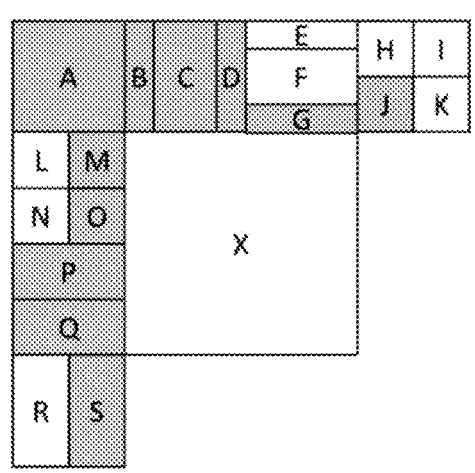

FIGS. 9 and 10 are diagrams illustrating a method of inserting a neighboring block adjacent to a current block into a candidate list according to one embodiment of the present invention.

At least one neighboring block (up to a maximum of V neighboring blocks) adjacent to the current block may be inserted into the candidate list for the current block. Here, the V may be 0 or any positive integer. In this case, that the neighboring block is adjacent to the current block may mean that at least one of the boundaries and the vertexes of the current block is in contact with at least one of the boundaries and the vertexes of the neighboring block.

Here, blocks located within a distance corresponding to the vertical size of the current block from the upper end position of the current block may be referred to as neighboring blocks adjacent to the current block. Here, blocks located within a distance corresponding to the horizontal size of the current block from the left end position of the current block may be referred to as neighboring blocks adjacent to the current block.

The neighboring blocks adjacent to the boundaries of the current block may be preferentially inserted into the candidate list and the neighboring blocks adjacent to the vertexes of the current block may then be inserted into the candidate list. The neighboring blocks adjacent to the vertexes of the current block may be preferentially inserted into the candidate list and the neighboring blocks adjacent to the boundaries of the current block may then be inserted into the candidate list.

The neighboring blocks adjacent to the left boundary of the current block may be preferentially inserted into the candidate list and the neighboring blocks adjacent to the upper boundary of the current block may then be inserted into the candidate list. The neighboring blocks adjacent to the upper boundary of the current block may be preferentially inserted into the candidate list and the neighboring blocks adjacent to the left boundary of the current block may then be inserted into the candidate list.

Even a case where at least one block present between the current block and a neighboring block, the neighboring block can be expressed as being adjacent to the current block. For example, referring to FIG. 9, blocks E, F, H, I, K, L, N, and R can be expressed as being adjacent to the current block.

Gray blocks in FIGS. 9 and 10 represent neighboring blocks that can be inserted into the candidate list because the gray blocks are adjacent to the current block X. Here, blocks B, C, and D may be child blocks resulting from ternary tree partitioning of a parent node, blocks E, F, and G may be child blocks resulting from horizontal ternary tree partitioning of a parent block, blocks P and Q may be child blocks resulting from horizontal binary tree partitioning of a parent block, blocks R and S may be child blocks resulting from vertical binary tree partitioning of a parent block, blocks H, I, J, and K may be child blocks resulting from quad tree partitioning of a parent block, and blocks L, M, N, and O may be child blocks resulting from quad tree partitioning of a parent block. This block partition example is commonly used in the subsequent figures of the drawings.

In this example, the candidate list in the example of FIG. 9 may be configured to include at least one block among the blocks A, B, C, D, and E adjacent to the current block X. In the example of FIG. 10, the candidate list is configured to include at least one block among the blocks A, B, C, D, G, J, M, O, P, Q, and S adjacent to the current block X.

Figures 11, 12:
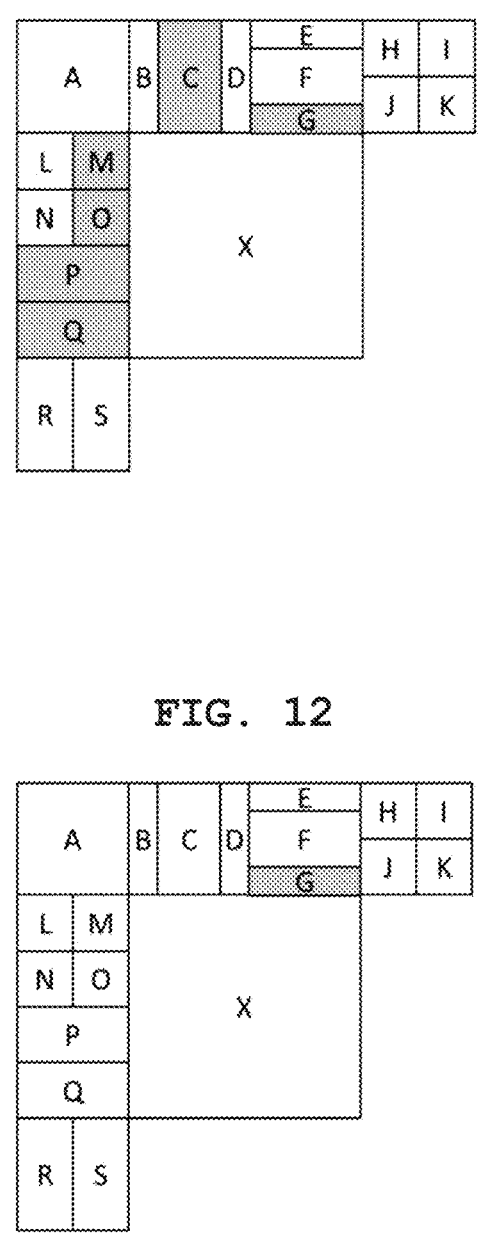

FIGS. 11 and 12 are diagrams illustrating a method of inserting a neighboring block adjacent to a current block into to a candidate list depending on the length of the border between the current block and the neighboring block, according to one embodiment of the present invention.

Among the neighboring blocks that are in contact with the current block, a maximum of V neighboring blocks may be inserted into the candidate list for the current block. Among the neighboring blocks that are in contact with the current block by a horizontal or vertical border length that is equal to or greater than N or more, a maximum of V neighboring blocks may be inserted into the candidate list for the current block.

When there is no neighboring block that is in contact with the current block by a border length that is equal to or greater than N among the neighboring blocks of the current block, the N is replaced with N−K and the neighboring blocks that satisfy the changed condition may be used to construct the candidate list for the current block. Here, the K may mean a positive integer greater than zero. That is, among the neighboring blocks that are in contact with the current block by a border length that is N−K or more and less than N, a maximum of V neighboring blocks may be inserted into the candidate list for the current block.

For example, the N may mean a positive integer that is the n-th power of 2 (=2n), such as 2, 4, 8, 16, and the like. Alternatively, the N may be determined according to at least one of the coding parameters of the current block and the coding parameters of the candidate. In addition, the N may be a value preset in the encoder/decoder or a value signaled from the encoder to the decoder.

For example, the neighboring blocks that are in contact with the current block may be preferentially inserted into the candidate list in order of decreasing border length. For example, the neighboring blocks that are in contact with the current block may be preferentially inserted into the candidate list in order of increasing border length.

Among the neighboring blocks that are in contact with the current block by a border length ranging from N to M, a maximum of V neighboring blocks may be inserted into the candidate list for the current block. Here, each of the M and N may mean a positive integer that is the n-th power of 2 (=2n), such as 2, 4, 8, 16, and the like.

In FIG. 11, gray blocks represent neighboring blocks that can be inserted into the candidate list because each of the gray blocks is in contact with the current block X and has a border length of N or more between the current block and the corresponding neighboring block. For example, the block X is a 32×32-size block, the block A means a 16×16-size block, the blocks B and D are 4×16-size blocks, the block C is an 8×16-size block, the blocks E and F are 16×4-size blocks, the block F is a 16×8-size block, the blocks H, I, J, K, L, M N, and O are 8×8-size blocks, the blocks P and Q are 16×8-size blocks, and the blocks R and S are 8×16-size blocks. These block size examples are commonly used in the subsequent figures of the drawings.

For example, in the example of FIG. 11, neighboring blocks having a border length of 8 or more in contact with the current block can be included in the candidate list. In this case, the candidate list for the current block X is configured to include at least one of the blocks C, G, M, O, P, and Q.

In FIG. 12, gray blocks represent neighboring blocks that can be inserted into the candidate list because each of the gray blocks is in contact with the current block X and has a border length of N or more between the current block and the corresponding neighboring block. For example, neighboring blocks having a border length of 16 or more in contact with the current block ca be included in the candidate list. In this case, the candidate list is configured to include the block G.

Figures 13, 14:
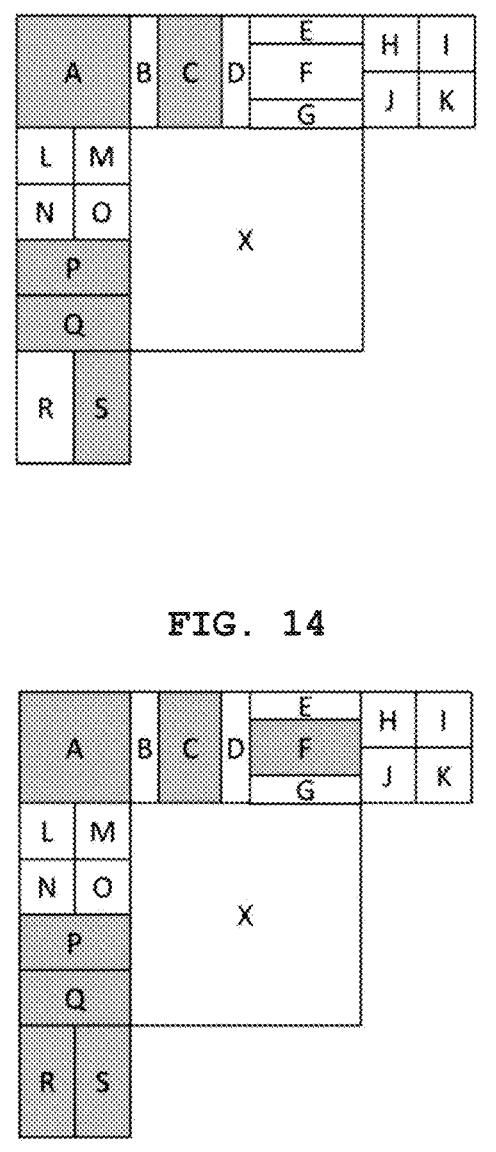

FIGS. 13 and 14 are diagrams illustrating a method of inserting a neighboring block adjacent to a current block into a candidate list depending on the size of the neighboring block, according to one embodiment of the present invention.

A maximum of V neighboring blocks among all the neighboring blocks of the current block may be inserted into the candidate list for the current block, depending on the size of each neighboring block. Hereinafter, the size of a block may mean at least one of the horizontal size, the vertical size, and the area.

For example, a maximum of V neighboring blocks among the neighboring blocks having a size of M×N or larger may be inserted into the candidate list for the current block. As another example, a maximum of V neighboring blocks among the neighboring blocks having a size of M×N or smaller may be inserted into the candidate list for the current block.

As a further example, a maximum of V neighboring blocks among the neighboring blocks having a size within a range of from M×N to P×Q may be inserted into the candidate list for the current block. Here, the P may mean the horizontal size of the block, Q may mean the vertical size of the block, each of the P and Q may be a positive integer.

As a further example, when at least one of the horizontal size and the vertical size of a certain neighboring block is larger than the M or the N, the neighboring block may be inserted into the candidate list.

As a further example, a maximum of V neighboring blocks among the neighboring blocks having an area that is equal to or greater than the product of M and N among all of the neighboring blocks of the current block may be inserted into the candidate list for the current block. As a further example, a maximum of V neighboring blocks among the neighboring blocks having an area that is equal to or less than the product of M and N among all of the neighboring blocks of the current block may be inserted into the candidate list for the current block. As a further example, a maximum of V neighboring blocks among the neighboring blocks having an area within a range of from the product of M and N to the product of P and Q among all of the neighboring blocks of the current block may be inserted into the candidate list for the current block.

Here, the M may mean the horizontal size of the block, N may mean the vertical size of the block, each of the M and N may be a positive integer. In addition, the M and the N may be the same value or different values. At least one of the M and the N may be determined according to at least one of the coding parameters of the current block and the coding parameters of the candidate. In addition, at least one of the M and the N may be a value preset in the encoder/decoder or a value signaled from the encoder to the decoder.

For example, the neighboring blocks adjacent to the current block may be preferentially inserted into the candidate list in the order of decreasing block size. Alternatively, the neighboring blocks adjacent to the current block may be preferentially inserted into the candidate list in order of increasing block size.

As a further example, when a certain neighboring block is equal to or larger than the current block in size, the neighboring block may be inserted into the candidate list. Alternatively, when a certain neighboring block is equal to or smaller than the current block in size, the neighboring block may be inserted into the candidate list.

In FIG. 13, gray blocks represent neighboring blocks that can be inserted into the candidate list because they have a size equal to or larger than a size of M×N. For example, when a certain neighboring block has a size of 16×8 or a size of 8×16 and the neighboring block can be inserted into the candidate list, the candidate list for the current block X is configured to include at least one of the blocks A, C, P, Q, and S.

In FIG. 14, gray blocks represent neighboring blocks that may be inserted into the candidate list because they have an area equal to or larger than the product (M×N) of M and N. For example, when a certain neighboring block has an area of 128 (=16×8) or (=8×16), the neighboring block can be inserted into the candidate list, and the candidate list for the current block X is configured to include at least one of the blocks A, C, F, P, Q, R, and S.

Figures 15, 16:
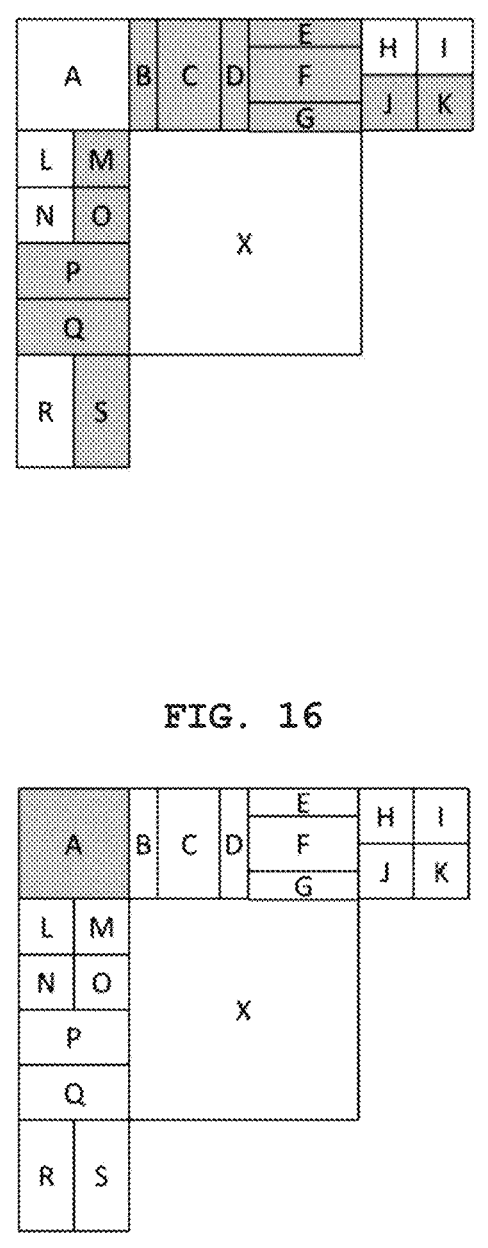

FIGS. 15 and 16 are diagrams illustrating a method of inserting a neighboring block adjacent to a current block into a candidate list depending on the depth of the neighboring block, according to one embodiment of the present invention.

A maximum of V neighboring blocks among all the neighboring blocks of the current block may be inserted into the candidate list for the current block, depending on the depth of each neighboring block.

For example, a maximum of V neighboring blocks among the neighboring blocks having a depth equal to or greater than K may be inserted into the candidate list for the current block. Alternatively, a maximum of V neighboring blocks among the neighboring blocks having a depth equal to or less than K may be inserted into the candidate list for the current block.

Further alternatively, a maximum of V neighboring blocks among the neighboring blocks having a depth in a range of from K to L, among all the neighboring blocks of the current block, may be inserted into the candidate list for the current block. Here, the L may be 0 or any positive integer.

Here, the K may be 0 or any positive integer. The K may be determined based on at least one of the coding parameters of the current block and the coding parameters of the candidate. In addition, the K may be a value preset in the encoder/decoder or a value signaled from the encoder to the decoder.

For example, the neighboring blocks adjacent to the current block may be preferentially inserted into the candidate list in order of decreasing partition depth. Alternatively, the neighboring blocks adjacent to the current block may be preferentially inserted into the candidate list in order of increasing partition depth.

As a further example, when a certain neighboring block has a depth that is equal to or greater than the depth of the current block, the neighboring block may be inserted into the candidate list. As a further example, when a certain neighboring block has a depth that is equal to or less than the depth of the current block, the neighboring block may be inserted into the candidate list.

In FIG. 15, gray blocks are neighboring blocks that may be inserted into the candidate list because they have a depth equal to or greater than K For example, the current block X has a depth of 1, the block A has a depth of 2, and the blocks B, C, D, E, F, G, H, I, J, K, L, M, N, O, P, Q, R and S have a depth of 3. These block depth examples may be commonly used in the subsequent figures of the drawings. For example, when a certain neighboring block has a depth equal to or greater than 3 and the neighboring block can be inserted into the candidate list, the candidate list for the current block X is configured to include at least one of the blocks B, C, D, E, F, G, J, K, M, O P, Q, and S.

In FIG. 16, gray blocks are neighboring blocks that may be inserted into the candidate list because they have a depth equal to or less than K. For example, when a certain neighboring block has a depth equal to or less than 2 and the neighboring block can be inserted into the candidate list, the candidate list for the current block X is configured to include the block A.

Figures 17, 18:
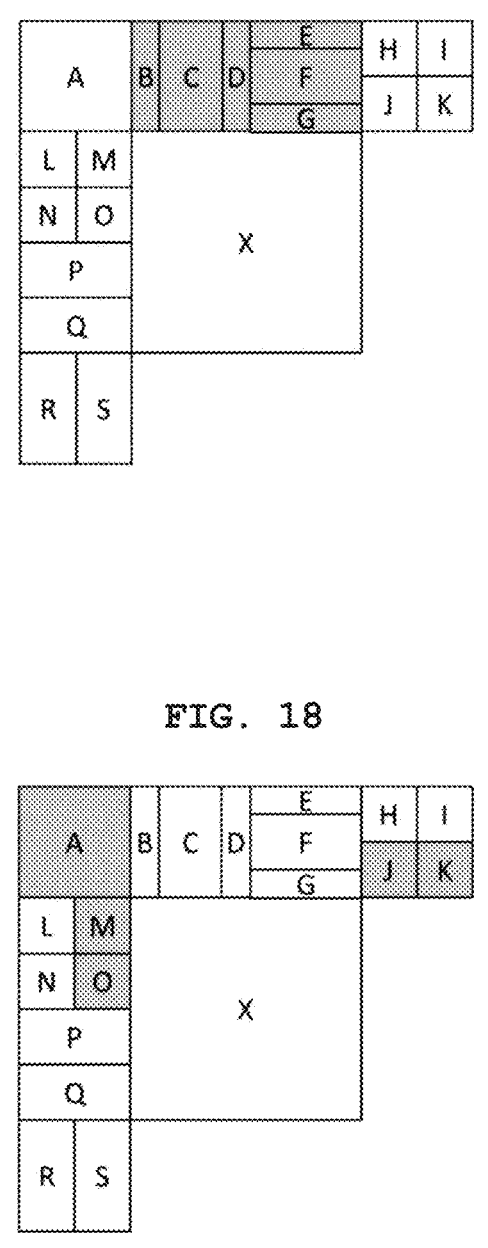

FIGS. 17 and 18 are diagrams illustrating a method of inserting a neighboring block adjacent to a current block into a candidate list depending on the partition type of the neighboring block, according to an embodiment of the present invention.

A maximum of V neighboring blocks among all the neighboring blocks of the current block may be inserted into the candidate list for the current block, depending on the partition type of each neighboring block.

For example, at least one of the quad tree blocks resulting from a quad tree partition among the neighboring blocks of the current block may be inserted into the candidate list for the current block. Alternatively, at least one of the binary tree blocks resulting from a binary tree partition among the neighboring blocks of the current block may be inserted into the candidate list for the current block. Alternatively, at least one of the ternary tree blocks resulting from a ternary tree partition among the neighboring blocks of the current block may be inserted into the candidate list for the current block.

Here, the binary tree partition may refer to an asymmetric binary tree partition in which the nodes have different sizes as well as a symmetric binary tree partition in which the nodes have the same size. In addition, the ternary tree partition may refer to an asymmetric ternary tree partition in which an upper block and a lower block provided on both sides of a middle block have different sizes or in which a left block and a right block provided on both sides of a middle block have different sizes as well as a symmetric ternary tree partition in which the upper block and the lower block have the same size or the left block and the right block have the same size.

Among the neighboring blocks adjacent to the current block, a neighboring block of a quad tree partition, a neighboring block of a binary tree partition, and a neighboring block of a ternary tree partition may be sequentially inserted in this order into the candidate list. Alternatively, among the neighboring blocks of the current block, neighboring blocks resulting from a ternary tree partition, neighboring blocks resulting from a binary tree partition, and neighboring blocks resulting from a quad tree partition may be sequentially inserted in this order into the candidate list.

Further alternatively, when the partition type of a certain neighboring block is the same as the partition type of the current block, the neighboring block may be inserted into the candidate list. Further alternatively, when the partition type of a certain neighboring block is different from the partition type of the current block, the neighboring block may be inserted into the candidate list.

FIG. 17 illustrates a state in which since gray blocks are neighboring blocks having a binary tree partition type, the gray blocks can be inserted into the candidate list. For example, blocks X, A, H, I, J, K, L, M, N, and O are quad tree blocks, blocks B, C, D, E, F, and G ternary tree blocks, and blocks P, Q, R, and S are binary tree blocks. These block partition type examples are commonly used in the subsequent figures of the drawings. For example, when a certain neighboring block is a ternary tree partition block, the neighboring block can be inserted into the candidate list. Thus, the candidate list for the current block X is configured to include at least one of the blocks B, C, D, E, F, and G.

FIG. 18 illustrates a state in which since gray blocks are neighboring blocks having the same partition type as the current block, the gray blocks can be inserted into the candidate list. For example, when the current block X is a quad tree block, quad tree neighboring blocks can be inserted into the candidate list. Thus, the candidate list for the current block X is configured to include at least one of the blocks A, J, K, M, and O.

Figures 19, 20:
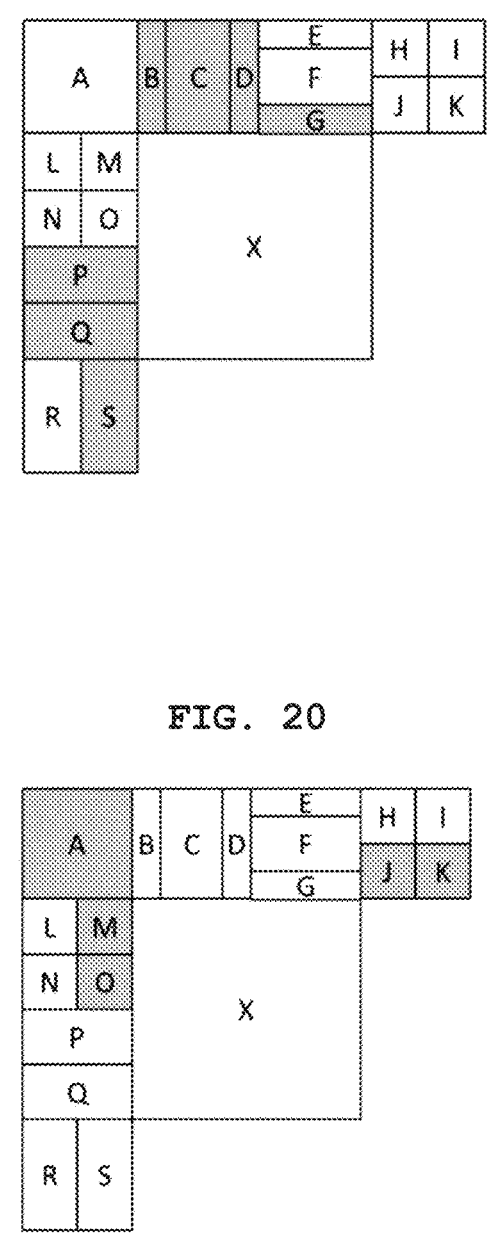

FIGS. 19 and 20 are diagrams illustrating a method of inserting a neighboring block adjacent to a current block into a candidate list depending on the block form of the neighboring block, according to one embodiment of the present invention.

A maximum of V neighboring blocks among all the neighboring blocks of the current block may be inserted into the candidate list for the current block, depending on the block form of each neighboring block.

For example, at least one neighboring block having a square form among the neighboring blocks of the current block may be inserted into the candidate list for the current block. Alternatively, at least one neighboring block having a non-square form (oblong form) among the neighboring blocks of the current block may be inserted into the candidate list for the current block.

Among the neighboring blocks of the current block, square neighboring blocks are preferentially inserted into the candidate list and non-square neighboring blocks are then inserted into the candidate list. Among the neighboring blocks of the current block, non-square neighboring blocks are preferentially inserted into the candidate list and square neighboring blocks are then inserted into the candidate list.

Further alternatively, when the block form of a certain neighboring block is the same as the block form of the current block, the neighboring block may be inserted into the candidate list. Further alternatively, when the block form of a certain neighboring block is different from the block form of the current block, the neighboring block may be inserted into the candidate list.

FIG. 19 illustrates a state in which since gray blocks are neighboring blocks having a non-square block form, the gray blocks can be inserted into the candidate list. For example, when a certain neighboring block has a non-square block form, the neighboring block can be inserted into the candidate list. Thus, the candidate list for the current block X is configured to include at least one of the blocks B, C, D, G, Q, and S.

FIG. 20 illustrates a state in which since gray blocks are neighboring blocks having the same block form as the current block, the gray blocks can be inserted into the candidate list. For example, when the current block X is a square block, the neighboring blocks having a square block form can be inserted into the candidate list. Thus, the candidate list for the current block X is configured to include at least one of the blocks A, J, K, M, and O.

When there are neighboring blocks that are in contact with the current block at one or more borders or at one or more vertexes, the neighboring blocks may be inserted into the candidate list, depending on at least one of their relative border length, their relative block size, and their relative block depth.

For example, when there are a first neighboring block having a border length of M and a second neighboring block having a border length of N, the M and the N are compared, and a specific neighboring block may be inserted into the candidate list according to the comparison result.

For example, when there are a first neighboring block having a border length of 4 and a second neighboring block having a border length of 8, the second neighboring block having a relatively long border length (i.e., 8) may be inserted into the candidate list. For example, when there are a first neighboring block having a border length of 16 and a second neighboring block having a border length of 4, the second neighboring block having a relatively short border length (i.e., 4) may be inserted into the candidate list.

Alternatively, when there are a first neighboring block having a size of N×M and a second neighboring block having a size of P×Q, the sizes of the two neighboring blocks are compared, and only a specific neighboring block may be inserted into the candidate list according to the comparison result. In this case, the N, M, P and Q may each be the same positive integer or different positive integers.

Alternatively, when there are a first neighboring block having a size of 8×8 and a second neighboring block having a size of 16×16, the second neighboring block having a relatively large size (i.e., 16×16) may be inserted into the candidate list.

Further alternatively, when there are a first neighboring block having a block depth of M and a second neighboring block having a block depth of N, the M and the N are compared, and a specific neighboring block among them may be inserted into the candidate list according to the comparison result.

For example, when there are a first neighboring block having a block depth of 0 and a second neighboring block having a block depth of 2, the first neighboring block having a relatively shallow depth of 0 may be inserted into the candidate list.

Figures 21, 22:
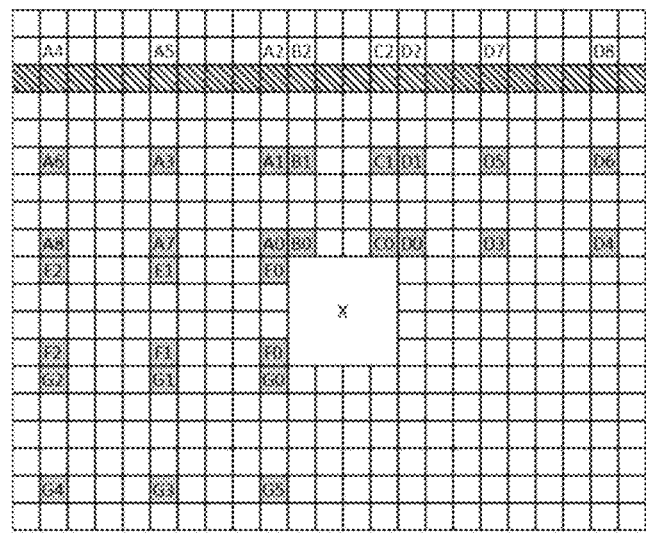
FIG. 21 is a diagram illustrating a method of inserting neighboring blocks into a candidate list in order of encoding/decoding the neighboring blocks, according to one embodiment of the present invention.
FIG. 22 is a diagram illustrating a method of inserting neighboring blocks into a candidate list depending on the locations of the neighboring blocks that are spaced by a specific distance from the location of a current block, according to one embodiment of the present invention.

FIG. 21 is a diagram illustrating a method of inserting neighboring blocks into a candidate list in order of encoding/decoding, according to one embodiment of the present invention.

A maximum of earlier V neighboring blocks among all the neighboring blocks of the current block may be inserted into the candidate list for the current block, according to the order in which the neighboring blocks are encoded/decoded. Here, the encoding/decoding order is at least one of a horizontal priority order, a vertical priority order, a Z shape order, a zigzag order, an upper right diagonal order, a lower left diagonal order, a raster order, a depth priority order, and a size priority order.

In FIG. 21, gray blocks are neighboring blocks that can be inserted into the candidate list in order of encoding/decoding. For example, when the neighboring blocks are encoded/decoded in order of A, B, C, D, E, F, G, H, I, J, K, L, M, N, O, P, Q, R, and S, a maximum of Z neighboring blocks beginning with the block A may be inserted into the candidate list in that order. FIG. 21 illustrates a case where the Z is four. In this case, the candidate list for the current block X is configured to include the blocks A, B, C, and D.

FIG. 22 is a diagram illustrating a method of inserting neighboring blocks into a candidate list depending on the locations of the neighboring blocks that are spaced by a specific distance from the location of a current block, according to one embodiment of the present invention.

Among the neighboring blocks that are positioned a specific distance from the current block, a maximum of V neighboring blocks may be inserted into the candidate list for the current block. That is, when a plurality of blocks is present between the current block and a certain neighboring block, a maximum of V neighboring blocks that satisfy a specific condition may be inserted into the candidate list for the current block.

A block or blocks that are positioned at least one of a horizontal distance of −K×M, a horizontal distance of +K×M, a vertical distance of −L×N, and a vertical distance of +L×N from a specific position of the current block may be determined to be neighboring blocks, and the neighboring blocks may be inserted into the candidate list. A block that is positioned at a location spaced by a horizontal distance of −K*M or +K*M and a vertical distance of −L*N or +L*N from at least one of specific positions of the current block may be determined as a neighboring block, and the neighboring block may be inserted into the candidate list.

In addition, among the neighboring blocks positioned at the above-mentioned locations, blocks included in a specific area relative to the current block may be inserted into the candidate list for the current block. In this case, the specific area may be a region preset in the encoder/decoder or may be signaled from the encoder to the decoder.

That is, the M and N may refer to relative distances with respect to a specific position in the current block. The specific position in the current block may be at least one of the (0, 0) position, (width−1, 0) position, (width, 0) position, (0, height−1) position, (0, height) position, (−4, −1) position, (−1, 0) position, (0, −1) position, (width−1, −1) position, (width, −1) position, (−1, height−1) position, (−4, height) position, (width/2−1, 0) position, (width/2, 0) position, (width/2+1, 0) position, (0, height/2−1) position, (0, height/2) position, (0, height/2+1) position, (width/2−1, −1) position, (width/2, −1) position, (width/2+1, −1) position, (−1, height/2−1) position, (−1, height/2) position, and (−1, height/2+1) position.

Here, the M may mean a sample-based horizontal distance, the N may mean a sample-based vertical distance, and each of the M and the N may be a positive integer. In addition, the M and the N may be the same value or different values. At least one of the M and the N may be determined according to at least one of the coding parameters of the current block and the coding parameters of the candidate. In addition, at least one of the M and the N may be a value preset in the encoder/decoder or a value signaled from the encoder to the decoder.

Here, the maximum of the absolute value of the M may be Max M and the maximum of the absolute value of the N may be Max N. The absolute value of the M and the absolute value of the N may be determined to be less than or equal to K or L times the size of a CTU.

Here, at least one of the Max M and the Max N may be a positive integer. At least one of the Max M and the Max N may be determined according to at least one of the coding parameters of the current block and the coding parameters of the candidate. In addition, at least one of the Max M and the Max N may be a value preset in the encoder/decoder or a value signaled from the encoder to the decoder.

Here, at least one of the K and L may be 0 or any positive integer. At least one of the K and L may be determined according to at least one of the coding parameters of the current block and the coding parameters of the candidate. In addition, at least one of the K and L may be a value preset in the encoder/decoder or a value signaled from the encoder to the decoder.

When a block that is positioned at the location spaced by at least one of a horizontal distance of −K×M or +K×M and a vertical distance of −L×N or +L×N is present in at least one of a picture, a sub-picture, a slice, a tile, a brick, a CTU boundary, a CTU row, and a CTU column, or is present across the boundary of at least one of a picture, a sub-picture, a slice, a tile, a brick, a CTU, a CTU row, and a CTU column, the neighboring block at the corresponding position may not be inserted into the candidate list.

When at least one of the neighboring blocks that are in direct contact with the current block does not exist, the neighboring blocks positioned a specific distance from the location of the current block may be inserted into the candidate list.

When the neighboring blocks that are positioned a specific distance from the location of the current block are inserted into the candidate list, the neighboring blocks may be inserted into the candidate list according to a specific scan order. Here, the specific scan order is at least one of a horizontal priority order, a vertical priority order, a Z shape order, a zigzag order, an upper right diagonal order, a lower left diagonal order, a raster order, a depth priority order, and a size priority order. In addition, the neighboring blocks may be inserted into the candidate list in order of increasing distance from the current block.

In FIG. 22, gray blocks represent neighboring block that can be inserted into the candidate list because they are positioned a specific distance from a position of the current block. For example, a portion indicated by diagonal lines in FIG. 22 may mean at least one of a picture, a sub-picture, a slice, a tile, a brick, a CTU boundary, a CTU row, and a CTU column.

As shown in the example of FIG. 22, when the current block X is a 16×16 block and M and N are each 16, neighboring blocks each of which does not extend beyond a boundary of a picture, a sub-picture, a slice, a tile, a brick, a CTU, a CTU row, and a CTU column are inserted into the candidate list. That is, the candidate list for the current block X is configured to include at least one of the blocks A0, A1, A3, A6, A7, A8, B0, B1, C0, C1, D0, D1, D2, D3, D4, D5, D6, E0, E1, E2, F0, F1, F2, G0, G1, G2, G3, G4, and G5. Therefore, neighboring blocks existing at relative positions with respect to the position of the current block may be inserted into the candidate list for the current block.

A case where a specific block is present at a boundary of at least one of a picture, a sub-picture, a slice, a tile, a brick, a CTU boundary, a CTU row, and a CTU column may mean that the specific block belongs to at least one of a picture, a sub-picture, a slice, a tile, a brick, a CTU boundary, a CTU row, and a CTU column that are respectively different from a picture, a sub-picture, a slice, a tile, a brick, a CTU boundary, a CTU row, and a CTU column to which the current block belongs, and may specifically mean that the specific block is present at the boundary of at least one of the picture, the sub-picture, the slice, the tile, the brick, the CTU boundary, the CTU row, and the CTU column. That is, it means that the specific block exists in at least one of a picture, a sub-picture, a slice, a tile, a brick, a CTU boundary, a CTU row, and a CTU column that are located above the current block or on the left side of the current block.

A case where a specific block extends beyond the boundary of at least one of a picture, a sub-picture, a slice, a tile, a brick, a CTU boundary, a CTU row, and a CTU column may mean that the specific block belongs to at least one of a picture, a sub-picture, a slice, a tile, a brick, a CTU boundary, a CTU row, and a CTU column that are respectively different from a picture, a sub-picture, a slice, a tile, a brick, a CTU boundary, a CTU row, and a CTU column to which the current block belongs, and may specifically mean that the specific block is present in at least one of the picture, the sub-picture, the slice, the tile, the brick, the CTU boundary, the CTU row, and the CTU column. That is, it means that the specific block exists in at least one of a picture, a sub-picture, a slice, a tile, a brick, a CTU boundary, a CTU row, and a CTU column that are located above the current block or on the left side of the current block.

Figure 23:
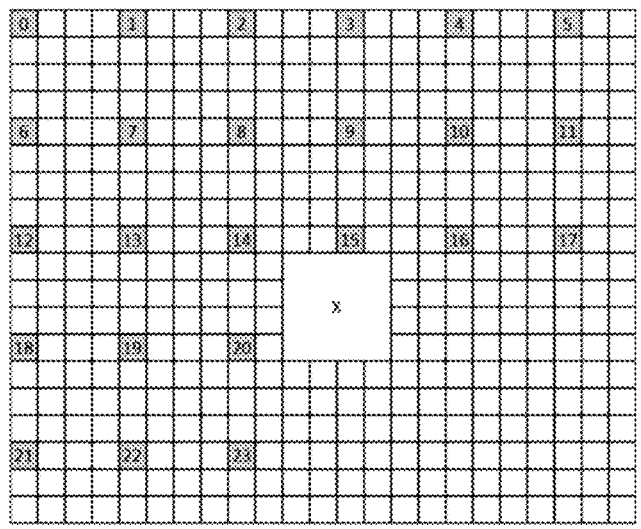
FIG. 23 is a diagram illustrating a method of inserting neighboring blocks into a candidate list depending on the locations of the neighboring blocks spaced by a specific distance from the position of at least one selected from among a current picture, a sub-picture, a slice, a tile, and a brick, according to one embodiment of the present invention.

FIG. 23 is a diagram illustrating a method of inserting neighboring blocks into a candidate list, depending on the locations of the neighboring blocks that are positioned a specific distance from the location of at least one selected from among a current picture, a sub-picture, a slice, a tile, and a brick, according to one embodiment of the present invention.

Among the neighboring blocks that are positioned a specific distance from the location of the current picture, sub-picture, slice, tile, brick, CTU boundary, CTU row, and CTU column, a maximum of V neighboring blocks may be inserted into the candidate list for the current block. That is, when a plurality of blocks is present between the current block and a certain neighboring block, a maximum of V neighboring blocks among the neighboring blocks may be inserted into the candidate list for the current block.

A block positioned at least one of a horizontal distance of K×M and a vertical distance of L×N from a specific position of a current picture, sub-picture, slice, tile, brick, CTU boundary, CTU row, or CTU column is determined as a neighboring block of the current block, and the neighboring block may be inserted into the candidate list. A block that is positioned at a location spaced by at least one of a horizontal distance of K*M and a vertical distance of L*N from a specific position of at least one of the current picture, sub-picture, slice tile, brick, CTU boundary, CTU row, and CTU column may be determines as a neighboring block, and the neighboring block may be inserted into the candidate list.

In addition, among the neighboring blocks positioned at the above-mentioned locations, blocks included in a specific area relative to the current block may be inserted into the candidate list for the current block. In this case, the specific area may be a region preset in the encoder/decoder or may be signaled from the encoder to the decoder.

The M and the N may be absolute distances from the specific position of at least one of the current picture, the current sub-picture, the current slice, the current tile, the current brick, the current CT boundary, the current CTU row, and the current CTU column. The specific position of at least one of the current picture, the current sub-picture, the current slice, the current tile, the current brick, the current CTU boundary, the current CTU row, and the current CTU column may be defined as (0, 0) position.

Here, the M may mean a sample-based horizontal distance, the N may mean a sample-based vertical distance, and each of the M and the N may be a positive integer of 2, 4, 8, 16, 32, and so forth (i.e., the n-th power of 2). In addition, the M and the N may be the same value or different values. At least one of the M and the N may be determined according to at least one of the coding parameters of the current block and the coding parameters of the candidate. In addition, at least one of the M and the N may be a value preset in the encoder/decoder or a value signaled from the encoder to the decoder.

Here, at least one of the K and L may be 0 or any positive integer. At least one of the K and L may be determined according to at least one of the coding parameters of the current block and the coding parameters of the candidate. In addition, at least one of the K and L may be a value preset in the encoder/decoder or a value signaled from the encoder to the decoder.

When at least one of the neighboring blocks that are in direct contact with the current block does not exist, the neighboring blocks positioned a specific distance from the location of the current picture, sub-picture, slice, tile, brick, CTU boundary, CTU row, and CTU column may be inserted into the candidate list.

When the neighboring blocks that are positioned a specific distance from the location of the current picture, sub-picture, slice, tile, brick, CTU boundary, CTU row, or CTU column are inserted into the candidate list, the neighboring blocks are inserted in a specific scan order. Here, the specific scan order may be at least one of a horizontal priority order, a vertical priority order, a Z shape order, a zigzag order, an upper right diagonal order, a lower left diagonal order, a raster order, a depth priority order, and a size priority order. In addition, the candidate blocks may be inserted into the candidate list in order of increasing distance to the current block from the neighboring blocks.

In FIG. 23, gray blocks represent neighboring block that can be inserted into the candidate list because they are positioned a specific distance from the location of a current picture.

In the example of FIG. 22, the specific position of the current picture is the (0, 0) position, the current block X is a 16×16 block, the K and L are positive integers including 0, and the M and N are each 16. In this case, the neighboring block located at the position (K*M, L*N) with respect to the position (0, 0) of the current picture may be inserted into the candidate list. Thus, the candidate list for the current block X is configured to include at least one of the blocks 0, 1, 2, 3, 4, 5, 6, 7, 8, 9, 10, 11, 12, 13, 14, 15, 16, 17, 18, 19, 20, 21, 22, and 23. In the position (K*M, L*N), the K of the x coordinate and the L of the y coordinate may be the same value or may be different values. Accordingly, neighboring blocks existing at absolute positions that are based on the position(s) of at least one of a current picture, a sub-picture, a slice, a tile, a brick, a CTU boundary, a CTU row, and a CTU column may be inserted into the candidate list for the current block.

A maximum of V neighboring blocks among all the neighboring blocks of the current block may be inserted into the candidate list for the current block, depending on a relationship between the coding parameters of the current block and the coding parameters of the neighboring blocks.

When at least one of the coding parameters of the current block is identical to at least one of the coding parameters of neighboring blocks adjacent to the current block, a maximum of V blocks among the neighboring blocks may be inserted into the candidate list for the current block.

For example, between the current block and a specific neighboring block, when the prediction modes are the same, when the intra luma prediction modes/directions are the same, when the intra chroma prediction modes/directions are the same, when the motion vectors are the same, when the motion vector differences are the same, when the reference picture lists are the same, when the reference picture indices are the same, when the reference pictures are the same, when the inter prediction directions (inter prediction indicators, prediction list utilization flags) are the same, when the merge mode utilization information is the same, when the skip mode utilization information is the same, when the motion vector prediction indices are the same, when the merge indices are the same, when the motion vector representation accuracies are the same, when the transform sizes are the same, when the primary transform utilization information is the same, when the secondary transform utilization information is the same, when the primary transform indices are the same, when the secondary transform indices are the same, when the residual signal presence information is the same, or when the quantization parameters are the same, the neighboring block may be inserted into the candidate list.

When at least one of the coding parameters of the current block is similar to at least one of the coding parameters of neighboring blocks adjacent to the current block, a maximum of V blocks among the neighboring blocks may be inserted into the candidate list for the current block.

For example, when a difference between the intra luma prediction mode/direction of the current block and the intra luma prediction mode/direction of a neighboring block is equal to or less than T, when a difference between the motion vector of the current block and the motion vector of the neighboring block is equal to or less than T, when a difference between the motion vector difference of the current block and the motion vector difference of the neighboring block is equal to or less than T, or when a difference between the reference picture index of the current block and the reference picture index of the neighboring block is equal to or less than T, the neighboring block may be inserted into the candidate list. Here, the T may be an integer.

For example, when the reference picture lists are different but the reference pictures are the same between the current block and a neighboring block, or when the reference picture indices are different but the reference pictures are the same between the current block and the neighboring block, the neighboring block may be inserted into the candidate list.

For example, identifiers of the coding parameters of the neighboring blocks to be included in the candidate list are entropy-encoded/decoded, and the neighboring blocks may be inserted into the candidate list depending on the similarity between the coding parameters.

For example, the identifiers of the coding parameters of the neighboring blocks to be included in the candidate list are entropy-encoded, and a neighboring block having the same value as the coding parameter, a neighboring block having a value greater than that of the coding parameter, or a neighboring block having a value less than that of the coding parameter may be inserted into the candidate list.

For example, the identifiers of the coding parameters of the neighboring blocks to be included in the candidate list are entropy-decoded, and a neighboring block having the same value as the coding parameter, a neighboring block having a value greater than that of the coding parameter, or a neighboring block having a value less than that of the coding parameter may be inserted into the candidate list.

As another example, a collocated block that is a block existing in a reference picture and being positioned at the same spatial position as the current block may be inserted into the candidate list as a neighboring block.

For example, at least one of the neighboring blocks belonging to a reference picture of the current picture among pictures that are not a picture to which the current block belongs may be inserted into the candidate list. At least one of the neighboring blocks belonging to the reference picture is referred to as a temporally neighboring block.

This neighboring block may mean a block located at the spatially same position as the current block among the blocks within the reference picture or may mean a block adjacent to a block located at the spatially same position as the current block among the blocks within the reference picture.

Hereinbelow, the step S830 of selecting and determining a reference block used to encode/decode the current block from among the neighboring blocks included in the candidate list will be described in detail.

Prior to the selecting and determining of the reference block to be used to encode/decode the current block from among the neighboring block in the candidate list, the candidate list may be modified using at least one of or a combination of the methods described below. When a combination of the methods described below is used, the methods are performed in specific order to modify the candidate list.

Each neighboring block included in the candidate list are called a candidate and information on each neighboring block included in the candidate list is also referred to as a candidate. Each block included in the candidate list is called a candidate and information on each block included in the candidate list is also referred to as a candidate.

The candidates in the candidate list are sorted in a specific order. The sorting may be performed based on at least one of the coding parameters of the current block and the coding parameters of the candidates.

The sorting may be performed such that the values of the coding parameters of the current block and the values of the coding parameters of the candidates are arranged in ascending order. The sorting may be performed such that the values of the coding parameters of the current block and the values of the coding parameters of the candidates are arranged in descending order.

The encoder sorts the candidates in the candidate list in order of high probability that the candidates in the candidate list are determined to be reference blocks and assigns candidate indices of short codeword length to candidates having high probability, thereby improving coding efficiency.

In this case, the encoder or the decoder may limit the size of the candidate list to a maximum of U. Here, the U may be 0 or any positive integer. The U may be determined on the basis of at least one of the coding parameters of current block and the coding parameters of the candidate. In addition, the U may be a value preset in the encoder/decoder or a value signaled from the encoder to the decoder.

For example, when there are more than U candidates in the candidate list, the excess of the candidates may be eliminated from the candidate list. The candidates to be eliminated may be determined according to a specific sorting order of the candidates in the candidate list.

The encoder or the decoder can eliminate a maximum of U candidates from the candidate list. Here, the U may be 0 or any positive integer. The U may be determined on the basis of at least one of the coding parameters of the current block and the coding parameters of the candidate. In addition, the U may be a value preset in the encoder/decoder or a value signaled from the encoder to the decoder.

When at least two candidates are duplicate in the candidate list, at least one of the duplicate candidates may be removed from the candidate list. At this time, a candidate having a higher rank in the candidate list among duplicate candidates may be left in the candidate list, and the other candidates having a lower rank may be removed from the candidate list. Here, when at least one of the coding parameters of candidates overlaps, these may be referred to as duplicate candidates.

The encoder or the decoder can add a maximum of U candidates to the candidate list. Here, the U may be 0 or any positive integer. The U may be determined on the basis of at least one of the coding parameters of the current block and the coding parameters of the candidate. In addition, the U may be a value preset in the encoder/decoder or a value signaled from the encoder to the decoder.

Candidates are added to the candidate list until the number of the candidates in the candidate list reaches the maximum number. In this case, duplicate candidates may be added to the candidate list.

When the encoder or the decoder add candidates to the candidate list, at least one of or a combination of embodiments of step S820 may be used.

The encoder or the decoder may determine a maximum of W neighboring blocks (candidates) included in the candidate list as reference blocks of the current block. The encoder or the decoder may determine a maximum of W pieces of block information (candidates) of neighboring blocks included in the candidate list as information on reference blocks of the current block.

Here, the W may be 0 or any positive integer. The W may be determined on the basis of at least one of the coding parameters of the current block and the coding parameters of the candidate. In addition, the W may be a value preset in the encoder/decoder or a value signaled from the encoder to the decoder.

For example, the encoder or the decoder may determine a maximum of W candidates in the candidate list as reference blocks of the current block in order to encode/decode the current block when the current block is to be predicted with a triangular partitioning mode. For example, the W may be 2. When the size of the current block is 8×8 or larger, the current block may be encoded/decoded with a triangular partitioning mode. The triangular partitioning mode may be an example of merge mode. The candidate list used to encode/decode the current block may refer to a merge candidate list. Information indicating whether the current block is to be decoded with a triangular partitioning mode may be signaled at a coding unit level.

When the current block is encoded/decoded with a triangular partitioning mode, the current block is split into two triangular regions. In this case, partition direction information used to split the current block into two triangular regions may be encoded/decoded. In order to decode each of the two triangular regions, neighboring blocks for encoding/decoding the respective triangular regions may be selected from the candidate list.

Indices for the respective triangular regions may be encoded/decoded to derive motion information of each of the triangular regions. For example, when a current block is split into a first region and a second region, a first index for encoding/decoding the first region and a second index for encoding/decoding the second region may be encoded/decoded. When two pieces of information on the reference blocks of the current block are determined, information indicated by a first index may be information on a first reference block of the current block and information indicated by a second index may be information on a second reference block of the current block.

The encoder or the decoder may select a first neighboring block and a second neighboring block from the candidate list for the current block by using the first index and the second index. In this case, the first region and the second region may share one candidate list derived based on the current block which is not yet split. The encoder or the decoder may encode/decode the first region using the information of the selected first neighboring block and encode/decode the second region using the information of the selected second neighboring block.

In the above-described triangular partition mode, the current block is split in a diagonal direction and the prediction is performed on each region. However, the triangular partition mode also may mean an operation described below.

When the current block is encoded/decoded with the triangular partition mode, the first neighboring block and the second neighboring block may be selected from a single candidate list on the basis of the first index and the second index for the current block. The encoder or the decoder may derive a first prediction block for the current block using the information of the first neighboring block and derive a second prediction block for the current block using the information of the second neighboring block.

The encoder or the decoder may generate a final prediction block for the current block by calculating the weighted sum of the first prediction block and the second prediction block. In this case, the weighted sum of the prediction blocks may be performed by weighting the first region for the first prediction block and weighting the second region for the second prediction block.

The first neighboring block may mean a first reference block of the current block, and the second neighboring block may mean a second reference block of the current block. The information of the first neighboring block may mean information of the first reference block of the current block, and the information of the second neighboring block may mean information of the second reference block of the current block.

The encoder or the decoder may encode/decode the current block using at least one of the determined reference blocks. The encoder or the decoder may encode/decode the current block using at least one piece of the block information of the determined reference blocks.

At least one piece of the block information of the determined reference block may be determined as the information of the current block. At least one piece of the block information of at least one reference block of the determined reference blocks may be determined as the block information of the current block.

Hereinafter, a method in which the encoder or the decoder determines a specific neighboring block in the candidate list as a reference block will be described. The encoder or the decoder may determine a candidate in the candidate list as a reference block using at least one or at least one combination of the methods described below.

For example, the encoder or the decoder may determine a Y-th candidate in the candidate list as a reference block. Hem, the Y may be 0 or any positive integer. The Y may be determined on the basis of at least one of the coding parameters of the current block and the coding parameters of the candidate. In addition, the Y may be a value preset in the encoder/decoder or a value signaled from the encoder to the decoder.

Since the Y-th candidate in the candidate list can be identified by the encoder/decoder, a candidate index specifying a reference block may not be entropy-encoded/decoded. The ordering of the candidates in the candidate list to determine the Y-th candidate may be performed according to the above-described embodiment regarding the method of storing candidates in the candidate list.

As another example, the encoder or the decoder may reduce or shorten the candidate list so that a maximum of Y candidates remains in the candidate list and determine the Y candidates as reference blocks. Here, the Y may be 0 or any positive integer. The Y may be determined on the basis of at least one of the coding parameters of the current block and the coding parameters of the candidate. In addition, the Y may be a value preset in the encoder/decoder or a value signaled from the encoder to the decoder.

For example, the encoder or the decoder may determine Y candidates as reference blocks by leaving only the Y candidates having the highest probability of being selected as reference blocks among candidates in the candidate list.

In this case, since the Y candidates in the candidate list can be identified by the encoder/decoder, candidate indices specifying the reference blocks may not be entropy-encoded/decoded.

Alternatively, the encoder or the encoder may determine a reference block by entropy-encoding/decoding a candidate index indicating a specific candidate in the candidate list. Here, the candidate index may be a value on which the position, order, etc. of the specific candidate in the candidate list are mapped. The encoder or the decoder may encode/decode the current block using the determined reference block (or at least one piece of the block information of the determined reference block).

That is, the encoder may encode the current block using a reference block (or at least one piece of block information of the reference block) selected from among the candidates in the candidate list, and entropy-encode a candidate index for the reference block. On the other hand, the decoder may entropy-decode the candidate index for the reference block and decode the current block using the candidate indicated by the candidate index among the candidates in the candidate list as the reference block (or at least one piece of the block information of the reference block).

For example, when the candidate list is composed of {A, B, C, D, E, F}, the indices of the candidates in the candidate list may be assigned {0, 1, 2, 3, 4, 5}. When the candidate index is 2, the candidate C is determined as a reference block. In addition, when the candidate index is 1, the candidate B is determined as the block information of a reference block.

The encoder or the decoder may entropy-encode/decode a maximum of Y candidate indices. When a plurality of candidate indices is entropy-encoded/decoded, the current block may be encoded/decoded using a plurality of reference blocks indicated by the plurality of candidate indices, respectively.

Here, the Y may be 0 or any positive integer. The Y may be determined on the basis of at least one of the coding parameters of the current block and the coding parameters of the candidate. In addition, the Y may be a value preset in the encoder/decoder or a value signaled from the encoder to the decoder.

That is, the encoder may encode the current block using the determined Y reference blocks among the candidates in the candidate list and may entropy-encode Y candidate indices for the Y reference blocks. On the other hand, the decoder may entropy-decode the Y candidate indices for the Y reference blocks and may decode the current block using the Y reference blocks respectively indicated by the Y candidate indices among the candidates in the candidate list.

Figure 24:
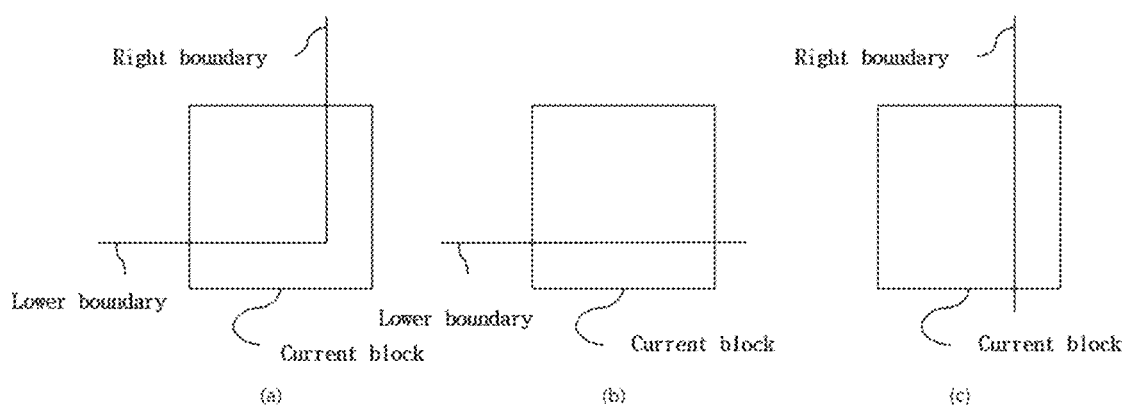
FIG. 24 is a diagram illustrating the boundaries of a picture, a sub-picture, a slice, a tile, and a brick, according to one embodiment of the present invention.

FIG. 24 is a diagram illustrating the boundaries of a picture, a sub-picture, a slice, a tile, and a brick, according to one embodiment of the present invention.

FIG. 24 illustrates the boundaries of a picture, a sub-picture, a slice, a tile, and a brick, according to one embodiment of the present invention. In FIG. 24, (a) illustrates a case where a right boundary and a lower boundary are present in the current block, (b) illustrates a case where a lower boundary is present in the current block, and (c) illustrates a case where a right boundary is present in the current block.

Figure 25:
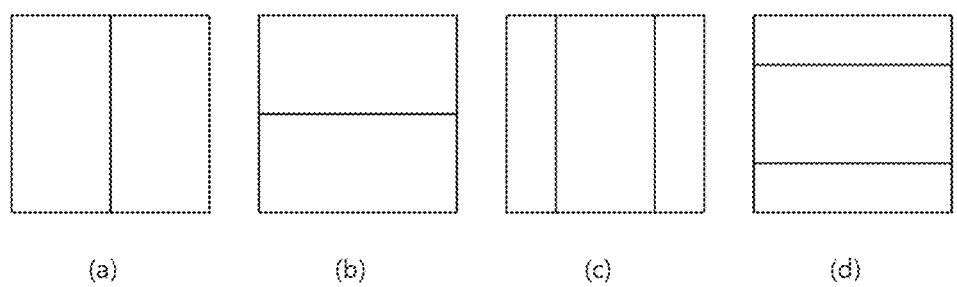
FIG. 25 is a diagram illustrating a block splitting scheme according to one embodiment of the present invention.

FIG. 25 is a diagram illustrating a block partitioning scheme according to one embodiment of the present invention.

FIG. 25 illustrates a block partitioning scheme according to one embodiment of the present invention. In FIG. 25, (a) illustrates vertical binary tree partitioning, (b) illustrates horizontal binary tree partitioning, (c) illustrates vertical ternary tree partitioning, and (d) illustrates horizontal ternary tree partitioning.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

In the reference picture list construction process and the reference picture list modification process, at least one of reference picture sets are used, and the reference picture sets become one or more reference picture lists among reference picture lists L0, L1, L2, and L3.

When calculating the boundary strength during the deblocking filtering, one or more motion vectors (a minimum of one motion vector and a maximum of N motion vectors) of the current block may be used. Here, the N may be a positive integer equal to or greater than 1. The N may be 1, 2, 3 4, or the like.

The above-described embodiments may be used even in a case where the precision of the motion vectors is a 16-pel unit, a 8-pel unit, a 4-pel unit, an integer-pel unit, a ½-pel unit, a ¼-pel unit, a ⅛-pel unit, a 1/16-pel unit, a 1/32-pel unit, or a 1/64-pel unit. In the encoding/decoding process of the current block, the pixel unit (precision) of the motion vectors can be adaptively selected from among the above-mentioned pixel units.

The shape of the block to which the embodiments of the present invention are applied may be a square shape or a non-square shape.

At least one of the syntax elements used for the adaptive in-loop filtering that is entropy-encoded by the encoder and entropy-decoded by the decoder may undergo at least one process selected from among binarization, debinarization, and entropy encoding/decoding. Here, for the binarization/debinarization and the entropy-coding/entropy-decoding, at least one of the following techniques may be used which include a signed 0-th order Exp_Golomb binarization/debinarization method (se(v)), a signed k-th order Exp_Golomb binarization/debinarization method (sek(v)), a 0-th order Exp_Golomb for positive integers with no sign (ue(v)), a k-th order Exp_Golomb binarization/debinarization method for positive integers with no sign (uek(v)), a fixed-length binarization/debinarization method (f(n)), a truncated Rice binarization/debinarization method or a truncated unary binarization/debinarization method (tu(v)), a truncated binary binarization/debinarization method (tb(v)), a context-adaptive arithmetic coding/decoding method (ae(v)), a byte-based bits string (b(8)), a binarization/debinarization method for integers with sign (i(n)), a binarization/debinariztion method for positive integers with no sign (u(n)), and unary binarization/debinarization method.

The present invention is not limited to a case where a current block is encoded/decoded according to only one specific embodiment among the above-described embodiments but covers a case where a current block is encoded/decoded using any combination of the above-described embodiments.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method comprising:
   decoding block partition information of a current block included in a current picture;
   determining a partitioning scheme for the current block according to the block partition information; and
   partitioning the current block using the partitioning scheme,
   wherein the partitioning scheme is determined according to whether the current block includes a boundary of the current picture,
   wherein the partitioning scheme is any one scheme selected from among quad tree partitioning, horizontal binary tree partitioning, vertical binary tree partitioning, horizontal ternary tree partitioning, and vertical ternary tree partitioning, and
   wherein when the current block includes the right boundary of the current picture and a height of the current block exceeds a predetermined value, the partitioning scheme is determined to be any one partitioning scheme except for the vertical binary tree partitioning.

2. The method according to claim 1, wherein when the current block includes a bottom boundary of the current picture and a width of the current block exceeds a predefined value, the partitioning scheme is determined to be any one of partitioning schemes except for the horizontal binary tree partitioning.

3. The method according to claim 1, wherein when the current block includes a bottom boundary of the current picture, the partitioning scheme is determined to be any one of partitioning schemes except for the vertical binary tree partitioning.

4. An image encoding method comprising:
   determining a partitioning scheme of a current block included in a current picture;
   partitioning the current block using the partitioning scheme; and
   encoding block partition information of the current block indicating the partitioning scheme of the current block,
   wherein the partitioning scheme is determined according to whether the current block includes a boundary of the current picture,
   wherein the partitioning scheme is any one scheme selected from among quad tree partitioning, horizontal binary tree partitioning, vertical binary tree partitioning, horizontal ternary tree partitioning, and vertical ternary tree partitioning, and
   wherein when the current block includes the right boundary of the current picture and a height of the current block exceeds a predetermined value, the partitioning scheme is determined to be any one partitioning scheme except for the vertical binary tree partitioning.

5. The method according to claim 4, wherein when the current block includes a bottom boundary of the current picture and a width of the current block exceeds a predefined value, the partitioning scheme is determined to be any one of partitioning schemes except for the horizontal binary tree partitioning.

6. A non-transitory computer-readable medium storing a bitstream generated by an encoding method, the method comprising:
   determining a partitioning scheme of a current block included in a current picture;
   partitioning the current block using a partitioning scheme that is determined; and
   encoding block partition information of the current block, wherein the partitioning scheme is determined according to whether the current block includes a boundary of the current picture, wherein the partitioning scheme is any one scheme selected from among quad tree partitioning, horizontal binary tree partitioning, vertical binary tree partitioning, horizontal ternary tree partitioning, and vertical ternary tree partitioning, and wherein when the current block includes the right boundary of the current picture and a height of the current block exceeds a predetermined value, the partitioning scheme is determined to be any one partitioning scheme except for the vertical binary tree partitioning.

\* \* \* \* \*